(12) United States Patent
Sze et al.

(10) Patent No.: US 8,984,576 B2
(45) Date of Patent: Mar. 17, 2015

(54) SYSTEM AND METHOD FOR TRANSMISSION OF DATA FROM A WIRELESS MOBILE DEVICE OVER A MULTIPATH WIRELESS ROUTER

(71) Applicants: David Sze, Waterloo (CA); Hagen Kaye, Waterloo (CA); Robert Flatt, Kitchener (CA); Joseph Robert (Wayne) Mallet, Kitchener (CA); Arif Hudda, Kitchener (CA); Barry Gilhuly, Waterloo (CA); Bogdan Frusina, Kitchener (CA)

(72) Inventors: David Sze, Waterloo (CA); Hagen Kaye, Waterloo (CA); Robert Flatt, Kitchener (CA); Joseph Robert (Wayne) Mallet, Kitchener (CA); Arif Hudda, Kitchener (CA); Barry Gilhuly, Waterloo (CA); Bogdan Frusina, Kitchener (CA)

(73) Assignee: Dejero Labs Inc., Kitchener, Ontario (CA)

( * ) Notice: Subject to any disclaimer, the term of this patent is extended or adjusted under 35 U.S.C. 154(b) by 0 days.

(21) Appl. No.: 14/114,984

(22) PCT Filed: Apr. 16, 2013

(86) PCT No.: PCT/IB2013/000690
§ 371 (c)(1),
(2) Date: Oct. 31, 2013

(87) PCT Pub. No.: WO2013/153442
PCT Pub. Date: Oct. 17, 2013

(65) Prior Publication Data
US 2014/0250486 A1 Sep. 4, 2014

Related U.S. Application Data

(63) Continuation-in-part of application No. 13/446,825, filed on Apr. 13, 2012, which is a continuation-in-part of application No. 13/183,652, filed on Jul. 15, 2011.

(60) Provisional application No. 61/364,598, filed on Jul. 15, 2010.

(51) Int. Cl.
*H04N 7/173* (2011.01)
*H04W 4/00* (2009.01)
(Continued)

(52) U.S. Cl.
CPC ............ *H04N 21/2365* (2013.01); *H04L 47/38* (2013.01); *H04N 21/41407* (2013.01);
(Continued)

(58) Field of Classification Search
USPC ........... 725/116; 370/338, 465; 455/445–466; 708/238
See application file for complete search history.

(56) References Cited

U.S. PATENT DOCUMENTS 7,529,230 B2 * 5/2009 Lewis et al. .................. 370/352
8,121,069 B2 2/2012 Lewis et al.
(Continued)

FOREIGN PATENT DOCUMENTS

WO 2010030489 A2 3/2010

OTHER PUBLICATIONS

Patent Cooperation Treaty, International Search Report and Written Opinion dated Sep. 16, 2013, issued on PCT Application No. PCT/IB2013/000690.
(Continued)

*Primary Examiner* — Mushfikh Alam
(74) *Attorney, Agent, or Firm* — Norton Rose Fulbright Canada LLP

(57) ABSTRACT

There is disclosed a system and method for transmission of multiple data streams from a mobile device to a network. In an embodiment, the system includes a multipath wireless router configured to provide a plurality of network connections including cellular, satellite, or wired Ethernet. An encoding module provided on the mobile device is configured to encode high volume data (e.g. high definition video) recorded by the mobile device into multiple data streams in dependence on the number of network connections available for transmission via the multipath wireless router. The encoding module provided on the mobile device transmits the multiple data streams to the wireless router using Wi-Fi to provide a local, short-hop, high capacity network connection. The plurality of network connections available via the multipath wireless router provides the necessary capacity and reliability to transmit a high volume of data, such as high definition video, virtually live.

20 Claims, 17 Drawing Sheets

(51) Int. Cl.
   *H04N 21/2365*   (2011.01)
   *H04L 12/811*    (2013.01)
   *H04N 21/414*    (2011.01)
   *H04N 21/61*     (2011.01)
   *H04W 28/10*     (2009.01)
   *H04W 76/02*     (2009.01)
   *H04L 12/803*    (2013.01)
   *H04L 12/54*     (2013.01)
   *H04N 21/238*    (2011.01)
   *H04L 12/841*    (2013.01)
   *H04W 28/08*     (2009.01)
   *H04L 12/853*    (2013.01)
   *H04L 12/825*    (2013.01)
   *H04L 29/06*     (2006.01)

(52) U.S. Cl.
   CPC ......... *H04N21/6131* (2013.01); *H04W 28/10* (2013.01); *H04W 76/025* (2013.01); *H04L 47/125* (2013.01); *H04L 12/5692* (2013.01); *H04N 21/238* (2013.01); *H04N 21/6106* (2013.01); *H04N 21/6143* (2013.01); *H04L 47/28* (2013.01); *H04W 28/08* (2013.01); *H04L 47/2416* (2013.01); *H04L 47/26* (2013.01); *H04L 69/14* (2013.01)
   USPC .......... 725/116; 725/117; 725/118; 370/338

(56) References Cited

U.S. PATENT DOCUMENTS

| | | | |
|---|---|---|---|
| 8,135,398 B2* | 3/2012 | Wang et al. | 455/426.2 |
| 2008/0170630 A1* | 7/2008 | Falik et al. | 375/240.29 |
| 2010/0082834 A1* | 4/2010 | Joung et al. | 709/231 |
| 2012/0008560 A1* | 1/2012 | Lewis et al. | 370/328 |

OTHER PUBLICATIONS

United States Patent and Trademark Office, Office Action dated Dec. 19, 2013, issued in U.S. Appl. No. 13/446,825.
Norton Rose Fulbright Canada LLP, Office Action Response dated Mar. 19, 2014, submitted on U.S. Appl. No. 13/446,825.
Patent Cooperation Treaty, International Search Report and Written Opinion dated Aug. 25, 2011, issued on PCT Application No. PCT/CA2011/050437.

* cited by examiner

SYSTEM AND METHOD FOR TRANSMISSION OF DATA FROM A WIRELESS MOBILE DEVICE OVER A MULTIPATH WIRELESS ROUTER

PRIORITY

This application claims priority to U.S. patent application Ser. No. 13/446,825, filed on Apr. 13, 2012.

FIELD

The present disclosure relates generally to the transmission of data streams over a wireless network. More particularly, the present disclosure relates to improving the transmission of a high volume of data from a wireless mobile device over multiple network connections.

BACKGROUND

In any given location, some networks perform better than others. This is true of wired and also of wireless networks. In regards to wireless networks in particular, in a crowd situation variable network performance can be exacerbated due to competition with other mobile devices for limited mobile resources.

In the area of video and audio data transmission there are many solutions to handle the loss of information through the delivery process. Typical poor delivery issues are solved today using either retransmission of data, or re-synchronization of the video and audio streams. Also used are buffering methods at the receiver that allow for small delays to access the data to allow for some data loss and slow delivery issues. It is also conceived that by splitting the video transmission into multiple paths that it is much less likely that a transmission failure occurs simultaneously on all paths. Therefore if each path contains enough data to build a video transmission there win generally always be data to display video information. When al paths are fully working then video information increases in quality. These traditional methods continue to be used today when transferring data over networks of an kinds.

More recently, smart phones, super phones, tablets and other mobile devices are being offered with built-in cameras capable of recording video in high definition. While capable of recording in high definition video and storing to local storage on the device such as a solid state drive (SSD), they generally do not have the capacity to reliably transmit live high definition video to a desired destination due to capacity limitations of the connected wireless network. Even the advent of 4G Long Term Evolution (LTE) networks may not be able to consistently and reliably transmit live high definition video due to fluctuations in capacity and the reliability of the network connection. Many of these mobile devices are able to connect to a Wi-Fi network. Wi-Fi is known to have a high bandwidth; however, the range Wi-Fi networks is typically relatively short and connection opportunities can be limited.

SUMMARY

In one aspect there is provided a system for transmission of data signals over a wireless network having: an encoding module for encoding video data into a plurality of buffers for transmission; and a feedback module for processing feedback from one or more sources, wherein the encoding module dynamically alters the amount of data that is encoded into the one or more video buffers based at least in part on the feedback received.

In another aspect there is provided a method for transmission of data signals over a wireless network including: encoding video data into a plurality of buffers; transmitting some of the data; processing feedback from one or more sources, wherein the feedback relates to delivery parameters; and dynamically altering the amount of data passed into the buffers based at least in part on the data received.

In another aspect there is provided a system and method for transmitting data from a wireless mobile device over a plurality of network connections multiplexed via a connected local WiFi network. In an embodiment, a controller connected to the WiFi network, receives from the wireless mobile device a transmission of one or more streams of data, separates the streams, and routes the streams over the plurality of network connections, each stream on its own path to the Internet or over one or more connected networks.

In another aspect, there is provided a system for transmission of multiple data streams from a mobile device to a network comprising: a wireless router configured to provide a plurality of network connections; and a router module provided on the mobile device, the router module configured to route data recorded by the mobile device into multiple data streams in dependence on the plurality of network connections for transmission to the multipath wireless router.

In another aspect, there is provided a method of transmission of multiple data streams from a mobile device to a network comprising: configuring a wireless router to provide a plurality of network connections; and providing a router module provided on the mobile device, the router module configured to route data recorded by the mobile device into multiple data streams in dependence on the plurality of network connections for transmission to the multipath wireless router.

In yet another aspect, a computer system for improving network communications involving at least one mobile device is provided, the computer system comprising: (A) at least one mobile device; and (B) a computer implemented network router linked to the mobile device, or associated mobile devices, and configured to connect to, or initiate the connection to, a plurality of networks using associated network connections, wherein the network router accesses iteratively real time or near real time performance data for the plurality of networks, and based on this performance data determines a network communication performance profile, and based on this performance profile splits the information into multiple data streams and controls the transfer of such multiple data streams via their associated network connections and networks, thereby improving transmission of the information from the mobile device; wherein the performance data is accessed iteratively, thereby optionally updating the performance profile successively, and permitting the network router to vary the selective transmission across the network connections based on updates to the performance profile.

In another aspect, the network router bonds a plurality of network connections based on the performance profile so as to improve, for the transmission of the information, data through-put, error resiliency, and robustness.

In a still other aspect, the information consists of audio or video data, and the computer system improves wireless network transfer conditions for audio or video data using a mobile device.

In yet another aspect, the network router is a wireless router that defines a plurality of wireless transfer channels for carrying the data streams, wherein each wireless transfer channel is operated independently of the other wireless transfer channels.

In a still other aspect, the wireless router encodes the information into the plurality of wireless transfer channels, and selectively varies an encoding rate for each of the plurality of the wireless transfer channels based on the then current performance profile.

In another aspect, the network router collects performance data for each of the network connections and also optionally overall performance data for the bonded network connections, and transfers such performance data to an encoding device via a wired or wireless connection in order to improve an overall data transmission rate provided by the computer system.

In yet another aspect, the wireless router automatically finds and connects to available wireless networks in the vicinity of the mobile device for use of such wireless networks as wireless transfer channels.

In another aspect, the wireless router is implemented at a location and provides improved quality of service to one or more mobile devices within an area in the vicinity of the location.

In another aspect, the wireless router is implemented to the mobile device, and provides a solution for improving performance of transfer of information over wireless networks from the mobile device.

In another aspect, wireless router is configured to enable sharing of wireless network resources across a plurality of mobile devices by permitting one or more first devices or boss devices to request available wireless network resources from one or more second devices or laborer devices, and access such available wireless network resources of the laborer devices, on a temporary basis, in order to improve wireless network connectivity performance at the boss device(s) in connection with an information transmission request.

In yet another aspect, each mobile device executes a mobile computing component, which when executed manages the sharing of wireless network resources between the laborer device(s) and the boss device(s).

In a still other aspect, the mobile computing component enables a user of a laborer device to select one or more preferences pertaining to the sharing of their mobile device's wireless network resources.

In yet another aspect, the mobile computing component enables the user of the laborer device to select their preferences dynamically, including based on a real time or near real time requests associated with a proximate boss device or boss devices.

In a still other aspect, the computer system includes a network connected server computer, wherein the server computer is linked to one or more applications or services, and the network router is configured to act as a proxy for connecting at least one mobile device to the server computer and thereby to its applications or services, and wherein the network router improves network communications as between the network router and the server computer.

In another aspect, the wireless router is configured to generate the performance profile in part based on cost considerations associated with the wireless networks, using one or more cost minimization rules.

In a still other aspect, the wireless router is configured to generate the performance profile based on performance of the wireless networks relative to one or more transfer requirements based on one or more attributes of the information.

In yet another aspect, the computer system includes a network connected server computer that includes programming which when executed enables the management of network resource sharing between the one or more boss devices and one or more laborer devices.

In a still other aspect the server computer includes or links to one or more gaming applications or computer network implemented gaming services, and the server computer enables the sharing of network resources between a group of devices that are varied between a boss status and a laborer status depending on their varying game status based on a game in a manner that achieves improved game experience for each player.

In another aspect, the computer system permits a mobile media professional, by means of the improved network communications, to transmit high definition audio and/or video data or to access studio resources implemented to a remote server computer or computer network implemented service.

Other aspects and features of the embodiments herein will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

Figure 1:
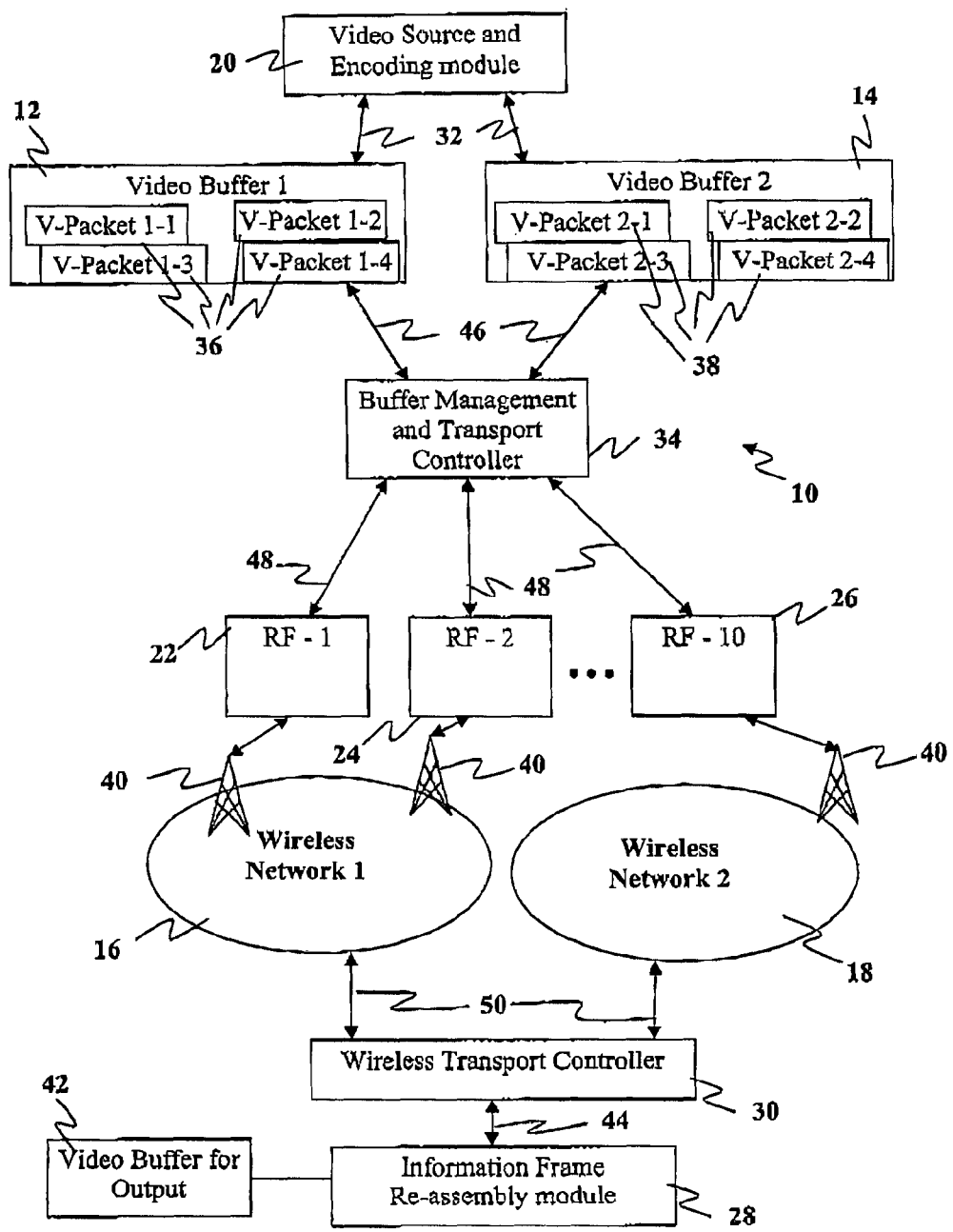
FIG. 1 is a block diagram of an exemplary system for distributing video signals.

In one aspect of the invention, computer systems and computer implemented methods are provided for improving the transmission of information from a mobile device, by (A) using the multipath streaming technology described herein, to provide (B) a novel and innovative wireless router technology.

In one aspect of the invention, "multipath wireless routing" is provided for the first time, which amongst other advantages described herein, allows a mobile device user (who may be a "subscriber" to the resources or services provided by the computer system of the present invention), to take advantage of other local devices with spare capacity, thereby increasing the available bandwidth and/or improving the subscriber's experience.

The computer implemented method and computer system described permits for example improved level of continuity of data streaming when wireless transmission using prior art technologies and methods produces anomalies that can cause lost, corrupt or delayed data streams. The technology described as a result improves for example recording and transmission of live video from a mobile device. The technologies described in this disclosure reduce for example the lost, corrupt or delayed data streams which may result in audio and video images that are jumping, broken, corrupt and perhaps even unwatchable.

This disclosure relates in particular to the problem of transmitting audio and video data from a wireless mobile device. The present technology differs from prior art solutions that have been focused on transmitting video data to mobile viewers. Different solutions are required for transmitting audio and video from a wireless mobile device for at least two reasons. One, transmitting video to mobile viewers is expected to be lossy, with frames dropping out on a regular basis. Many consumer solutions rely on a single radio connection to the Internet. Two, bandwidth is asymmetrical, with the bandwidth down (to the wireless mobile device) typically being many times the available bandwidth from the device. For example, representative numbers in some cases would be approximately 2 Mbps down, 300 Kbps up. This transmission of data from wireless mobile devices includes the transmission of large volumes of data that may be time critical, for example, data transmissions of either normal definition video (720 by 576), high definition video (1920 by 1080), or ultra high definition video (7680 by 4320). The transmission may also include unique environments such as real-time news reporting, mobile news, reality television shows, sporting event coverage and a range of similar situation where the information gathered is dynamic and mobile. In these situations a wireless link to a wireless infrastructure may be used by many industries. Such wireless networks include general packet radio service (GPRS), enhanced data for global evolution (EDGE), universal mobile telecommunication system (UMTS), wideband code division multiple access (W-CDMA) and many other 3G or 4G networks. Other wireless networks include WiFi, i.e. 802.11 technology (with all of its various standards), or a newer class of wireless technologies called worldwide interoperability for microwave access (Wi-MAX) and long-term evolution (LTE) that offer even greater throughputs and are intended to aid in delivering data such as television on demand and video conferencing on demand.

In this disclosure, the term video buffer is intended to refer to audio and video encoded data from a source being live, for example a video camera, a high-definition wireless mobile device such as a mobile phone with digital camera capabilities, tablet computers etc., or from a stored source like a disk or other storage media. Packaged information buffers for transmission over a wireless network will be referred to as V-Packets. Also in this disclosure the term mobile transmitter will refer to any sort of wireless mobile device being used to transmit information buffers to a destination.

As stated earlier, the present invention utilizes technology for dividing audio and/or video content into multiple data streams. Aspects of this technology are described for example in pending U.S. patent application Ser. No. 13/183,652 and also U.S. patent application Ser. No. 12/499,151. What follows is an explanation of aspects of this technology relevant to present invention.

It is noted that the disclosure refers extensively to audio and video data, in part because audio and video data constitute an example where network quality may not be sufficient to provide adequate reliability based on a range of applications or user requirements. For example, there may inadequate data throughput, error resilience or robustness to permit performance that meets the requirements of for example of media applications requiring live or almost live transmission. The references to "improvement of network performance" refers to a range of network performance issues that are improved upon by the technology of the present invention, including data throughput, error resilience, latency, and robustness.

A skilled reader will understand that the present invention may be used to improve network performance for other applications for which network performance is important, outside of transmission of audio data or video data, including for example the various other examples provided below that may not involve transmission or audio data or video data such as the "Studio Truck" example provided below.

While the present disclosure focuses on the transmitter side of for example a communication system based on the present technology, a transmitter configured based on the present invention as explained herein is in communication with a receiver, in part to receive information regarding network performance data such as missing data, network latency, and so on. Also, as illustrated in FIG. 12c the technology described in the present invention may also include a server computer (referred to for example in FIG. 12c). The server computer interoperates with the transmitter side computer for example to managing connection to remote resources, re-assembly and delivery of content, and so on.

Regarding error resilience, sending on multiple channels allows the transmitter to choose the most reliable connection to use for data transfer. If data is lost on a connection, the receiver can report it as missing, allowing the transmitter the time to resend it. Lost or missing packets can be prioritized on connections with the lowest latency to minimize the chance of the lost packet affecting the data output. For a video stream, which is allowed to lose data packets, the chance to have an error in the output video stream is minimized. In the more general case, where data must be delivered, the packets are retried on the most reliable links. Since data can not be lost, this may incur additional delay (end to end), but is recoverable as the data output rate is not fixed.

In another aspect of the technology, the computer system of the present invention can include a transmitter and receiver configured to interoperate to minimize end-to-end latency (sometimes known as the glass-to-glass latency) for the data stream. In some cases, frequently with video, but with other applications as well, the operator specifies a maximum delay from data capture to reception and subsequent release (as available video). In such an implementation, the computer system of the present invention ensures that the output data stream is not allowed to deviate from this latency requirement, dropping data packets if required to keep up.

For general purpose IP (e.g. tunneled TCP/IP), dropping data generally is not viable. Therefore the computer system attempts to minimize perceived latency, but can not drop data to catch up. By transmitting data on the first available, lowest latency connection, perception of delays can be managed. This is particularly important in cases where the traffic is directly related to operator interaction (e.g. establishment of an SSH session). Network latency directly impacts the operators perception of the system's transfer speed and responsiveness. The controller constantly measures (and monitors) a connection's network latency. If the latency increases past a threshold, the transmitter controller start to reduce the amount of data sent via that connection. If the latency continues to grow, the data rate is reduced further, perhaps even terminated if the latency becomes too long to be useful. In the case of video, that second threshold is defined by the configured glass-to-glass latency less the required frame processing time. General purpose connections may use any of a number of algorithms to define the second threshold, the simplest being to define a hard cut-off: a connection with a latency of greater than 'n' seconds isn't useful.

Connections that have failed (either outright connection loss reported by the RF module or calculated failure based on factors such as latency) can be removed by the multipath router of the present invention and thereby removed from the transmission pool and their bandwidth is no longer available for data transmission. The remaining available bandwidth is tabulated and the data stream is adjusted if possible. In the general case adjusting the volume of data may not be possible, and in fact that this may generally not be the case of the responsibility of the multipath router of the present invention.

Similarly, when a connection has recovered, it is added back into the transmission pool, and its bandwidth once again contributes to the overall transfer rate. Also, this disclosure refers to use of multipath streaming to utilize a plurality of network connections in a unique and innovative way, to improve for example data transmission performance from a mobile device. One aspect of the technology described is a multipath router, which may be implemented in part as the multipath wireless router ("MWR") described herein.

One aspect of the multipath router is that it permits improved network performance for a variety of applications in challenging network conditions, such as for example using wireless networks which are affected for example by noisy environments and competition by other devices for finite resources, for example in high traffic environments. Mobile devices connected to wireless networks provide a compelling use case of the advantages of the present invention, however, a skilled reader will understand that the present invention is not limited to use in connection with wireless networks. Rather the, multipath router is designed to provide an architecture that is flexible so as to enable the use in connection with a variety of different network types or configurations, including for example Wi-Fi, cellular networks, satellite networks, wired data connections, and other networks. One aspect of the invention, is the present technology's ability to bond a variety of available connections, and improve their performance overall by splitting defined content or information (audio data or video data being just one example) and based on information obtained regarding the current performance of two or more associated networks (which may be of different types) selectively transferring the content across the two or more associated networks in a way that improves the quality of data transmission relative to the current network performance.

The technology may be used to support a number of different applications, products and architectures, as described below. For example, data through-put may be improved by bonding and adapting multi-stream transfer using a physical connection and also an available cellular network connection in a way that improves the network performance that would have been possible using the physical connection alone. The use case of a mobile device in an environment with multiple possible cellular networks to connect to provides a compelling but non-limitative use case. A skilled reader will understand that various other permutations are possible.

General System Implementations

The multipath router of the present invention may be implemented to at least one computer. While the present invention discusses use of the present technology for improving transmission from at least one mobile device, a skilled reader will understand that there may be advantages to use of the present invention for improving delivery of information to a mobile device.

The multipath router may be implemented as a routing module that in one implementation, (A) provides instructions to an encoder (such as a video encoder) for splitting information and encoding information, which is then (B) encoded into multiple streams again based on instructions from the routing module, such that the data packets through the multiple streams are directed along network paths controlled by the routing module.

In one implementation, the encoder is a separate component from multipath router, however, it is possible that these components may be integrated.

In one implementation, the mobile device includes an encoder. In connection with a mobile device, the multipath router may also be implemented to the mobile devices (as explained below) or may be included in one or more devices other than the mobile device. As explained below, a plurality of multipath routers may be linked to one another in a number of different configurations. In one representative configuration, a mobile device uses a first multipath router, and when network resources linked to the first multipath router are used up, the mobile device may then utilize the resources of a second multipath router, and so on.

In addition, while the present technology is used to improve transmission of information from at least one mobile device, the present invention in part uses information regarding network performance that is generally obtained from at least one receiver. In one aspect, the present invention, may include a transmitter side component and at least one receiver side component that is configured to send network performance data for the associated network. As explained below, the described technology is generally connected to a plurality of networks, across a plurality of wireless transfer channels or links, and for each such channel or link there may be a receiver that sends channel or link information to the transmitter side component. This process provides the feedback to the multipath router is then used by the multipath router (or a controller that is part of the multipath router) to control the transfer of such multiple data streams via their associated networks.

In one example, the controller can calculate expected response times, in part based on the receiver feedback and rules used to generate the performance profile, and this information may be provider for example to an operator.

In another aspect, the network performance data is accessed iteratively in this manner.

In another aspect, the multipath router includes a plurality or rules for varying the encoding rate for each into the multiple data streams. The multipath router uses the rules for determining a "performance profile" for improving for example the transmission of content using multiple data streams, based on the current network performance data. Again, based accessing network performance data iteratively, the performance profile may be updated successively, and permitting the multipath router to vary the selective transmission across the network connections based on updates to the performance profile.

A skilled reader will understand that the rules, and associated performance profiles, may be based on a number of known strategies for addressing network performance parameters such as link avoidance, optimizing data rates, transferring data packets to another link, and so on.

In one aspect of the invention, for example as shown in FIG. 12c, a server computer (51) receives the multiple data streams across different networks. This server computer (51), in one implementation, is responsible for reassembly of the data packets from the multiple streams back into a single stream. Any issues with lost or missing data, as well as data rates, approximate buffer time, and other connection status reports are sent back by the server computer to the transmitter to assist in the control and operation of the connected networks. Another role of server computer (51) is the co-ordination of resources across multiple multipath routers.

Figure 14:
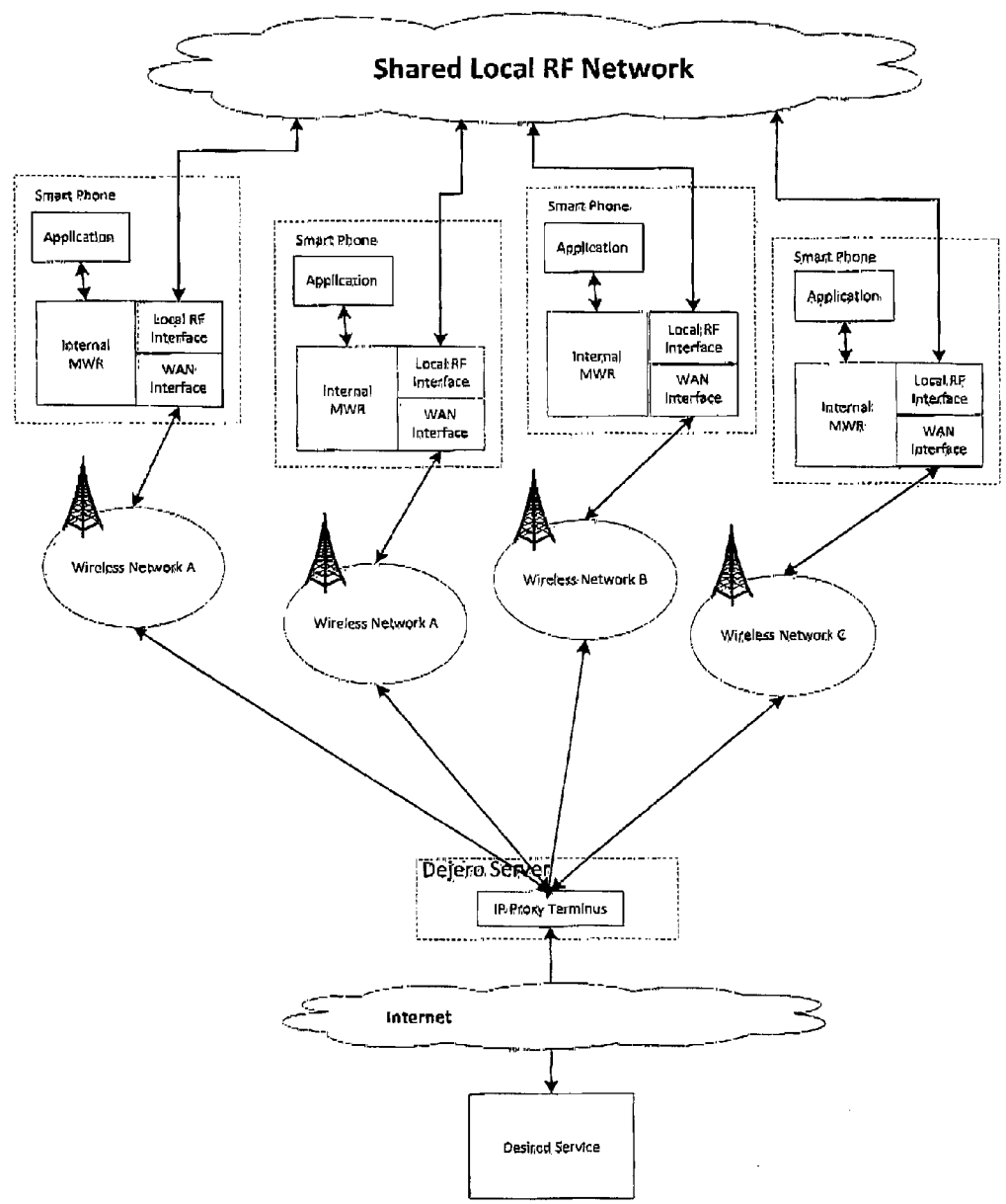
FIG. 14 further illustrates multiple mobile devices, each including a mobile application that enables the mobile devices to share network resources.

The server computer (51) for example as shown in FIG. 12c or 14 can be implemented as a terminus of a TCP/IP tunnel. One or more mobile devices connected to the MWR (in one implementation) connect to the server computer (51) and then can use this tunnel as a means to access systems and services local to where the server computer (100) is installed. For example, if the server computer (51) is installed in a studio/corporation behind the firewall, the operators are able to access private/internal systems not visible to the general Internet. In addition, users may utilize the present invention to provide performance in accessing such systems or services that would not otherwise be possible using available network connections based on prior art approaches.

A skilled reader will understand that the server computer (51) may also be a virtual instantiation, part of a cloud network. If this is the case, the video output could be made available as a web stream, playable from/to a content delivery network (CDN). Users of the general data service would only have access to those websites, servers and services available on the wider internet.

Another aspect of the invention is that the MWR, as described below, may be implemented to a mobile device, as a mechanism to improve for example network data transmission from the mobile device. This may be achieved, optionally, by a first mobile device using available capacity from mobile devices in its vicinity. The first mobile device may be referred to as a "master" device or "boss" device, whereas the second mobile devices may be referred to as "slave" devices or "laborer" devices. The first and second mobile devices may constitute a group of associated devices, for example based on having subscribed to a service that implements the technology of the present invention.

A skilled reader will understand that for example in the case of a video stream, present invention permits that the result be played out in real-time—at the same rate as it was encoded, which is typically fixed by one of a number of video standards. This result was not possible using prior art technologies, or required significant and costly infrastructure that is not required using the present invention.

Example of General System Implementation

It is useful to illustrate the general system implementation by referring to a series of general system workflows.

In one example, a mobile device establishes a session with the MWR and requests a video connection. For this type of connection the MWR may embody rules that determine that the MWR assumes certain characteristics/behaviour of the data and output stream. For instance, since video must be played out in real time, lost data packets are not allowed to delay the stream and add to the glass-to-glass latency. A video stream is allowed to drop lost packets if required. Note that this is extremely undesirable, but occasionally necessary for recovery. The MWR responds with a list of currently available connections, as well as their aggregate and individual data rates.

A number of different routes are possible. For example, as part of the connection setup, the mobile device can instruct the MWR to handle the routing aspect. The mobile device is only concerned then about the overall, aggregate data rate. The mobile device then starts encoding the stream based on the supplied data rate. As the video is streamed, the MWR is responsible for splitting the stream into data packets and routing the packets appropriately. The data rate for each connection is calculated continuously and as it changes, the aggregate rate is reported to the mobile device. The mobile device is responsible for adjusting its encoding/compression rate in response to the MWR's connection feedback.

In another aspect, the mobile device can instruct the MWR to provide delivery and reporting only. All routing decisions are made by the mobile device—this is more typical situation when the mobile device must already make routing decisions between internal WAN and WiFi connections for example. In this case, the mobile device encodes and converts the stream into packets based on the aggregate rate of all available connections. Each packet is directed to one of the connections based on their reported available bandwidth. If the bandwidth of an individual connection changes, the mobile device checks whether this impacts the overall rate (or if one of the other connections can pick up the change in data rate).

The multipath router can then provide information to the mobile device that is used by the mobile device to further adapt to changing network performance parameters. For example, the multipath router may provide the current data rate to the mobile device, and the mobile device adjust the encoding/compression rate based on (i) the current data rate, (ii) the backlog caused by the decrease in rate of a connection, and (iii) the data required to resend any missing packets. The backlog and retries can be converted to a rate by dividing by the amount of time remaining to deliver those bits in time (as defined by the configured glass-to-glass latency). Typically, if the sum based on the relevant data rates is greater than the aggregate data rate available, the encoding/compression rate must be adjusted.

Multipath Streaming

Multipath streaming technology referred to in this disclosure may be understood by referring to FIGS. 1-5. A skilled reader will understand that particular embodiments of the multipath streaming are described herein, by way of example. Not all aspects of these particular embodiments are required, in fact a skilled reader will appreciate that different multipath streaming may be used to implement the features of the present invention, or the multipath streaming technology described herein as background may be modified.

FIG. 1 for example illustrates a block diagram of an exemplary system 10 with multiple information buffers 12, 14 using multiple wireless networks 16, 18 to transmit information. In situations and environments where information is preferably dynamically delivered from mobile locations or devices, a mobile sourced video solution can be required. This information or mobile sourced video may have originated from cameras or some other advanced capture method, or the information may have been pre-captured and saved to a storage media to be transferred at a later time. After preparing the video data into buffers 12, 14, a steady and continuous flow of buffers may be sent from a mobile transmitter to a receiver via various techniques. The system 10 provides the ability to modify the video quality at the source by adjusting the amount of video information encoded into the buffers 12, 14 at the transmitter as described herein. Video quality can be dynamically adjusted (improved or degraded) in response to feedback from the network both locally and remotely, such as, for example, local queues at the transmitter or the remote receiver.

In the system 10 of FIG. 1, the video source data is prepared for transmission and moved into the video buffers 12, 14 by the Video Source and Encoding module 20, which may contain a storage component used to store data or video information. Many video buffers for example could be used and the data may be divided between the various buffers. Captured information can include, for example, normal, high or extremely high definition audio and video content. Preparation may include advanced compression (for example moving picture expert group (MPEG) compression), packetization and other processes designed to improve transmission. In some embodiments, video data from a single source, either live or stored, can be divided into multiple video streams using a technique like Multiple Descriptive Coding (MDC). Other techniques can also be used to break the video data stream into different packets for delivery over various links. The division of the data is intended to allow for wireless delivery of data in multiple video buffers 12, 14 over one or more wireless network links, (Radio Frequency-1 (RF-1) 22, RF-2 24 and RF-10 26) over one or more wireless networks 16, 18 to an Information Frame Re-assembly component 28, via a wireless transport controller 30. Each of the processes shown can be executed within one or more computer systems and the division of labor between computer systems may be based on processing unit utilization and network capacity restrictions. Depending on conditions and processing unit availability, a complex video splitting method like MDC can be used or a simple packetization and splitting method could be substituted in its place. Within this encoding stage, the number of frames-per-second (FPS) is determined and the output enables dynamic adjustment of the quantity of information that is placed into the video buffers 12, 14 and subsequently transmitted to the Information Frame Re-assembly component 28.

The linkage 32 between the Video Source and Encoding module 20 and the Video Buffers 12, 14 could be external, for example, over FireWire, a Universal Serial Bus (USB) link, Serial connection, Bluetooth, WiFi wireless link or some other high speed link. Alternatively, in a fully integrated system the Video Source and Encoding module 20 could be together with the Video Buffers 12 and 14 in the same physical housing.

The system 10 can include a Buffer Management and Transport controller 34 which acts as an interface to a plurality of Radio Frequency (RF) modules 22, 24 and 26. In FIG. 1 only three RF modules are illustrated as RF-1 22, RF-2 24 and RF-10 26, however any number of modules may be included depending on the system. The Buffer Management and Transport Controller 34 accesses and reads portions of data in the Video Buffers 12 and 14. The portions of data labeled as V-Packet 1-1 36 to V-Packet 2-4 38 are created based on various factors including, but not limited to, the packet size restrictions of the wireless networks 16 and 18, other packet transmission results, configuration parameters and other such guidance within the overall system architecture.

The Buffer Management and Transport Controller 34 receives messages from RF modules 22, 24 and 26. The RF modules 22, 24 and 26 can return messages from an information Frame Re-assembly module 28, via the Wireless Transport Controller 30 and from interactions with one or more Wireless Networks 16, 18 through base stations 40 that are within a coverage region. These messages represent feedback on coverage, congestion, transmission failures with each base station 40 during the process of trying to exchange messages. In turn this information guides the Buffer Management and Transport Controller 34 to decide what quality of video information to packetize, how much information to send and through which RF modules 22, 24 and 26, and through which linkage 48.

Once information is received by the Information Frame Re-assembly module 28, the information is collected into a video buffer for output 42. This buffer could be within the same computer system as the Information Frame Re-assembly module 28 or it could be housed in a separate system through a well-known link, like USB, FireWire or some high speed transfer connection. Linkage 44 between the Wireless Transport Controller and the Information Frame Re-assembly 28 could be over, for example, a high-speed computer bus (multiple CPUs in the same physical housing), or over gigabit Ethernet (TCP/IP) or some other well known coupling method. The wireless transport control has a further link 50, where it is linked to wireless networks within the coverage range. A further linkage is created between the Buffer Management and Transport Controller and the video buffers 46.

Figure 2:
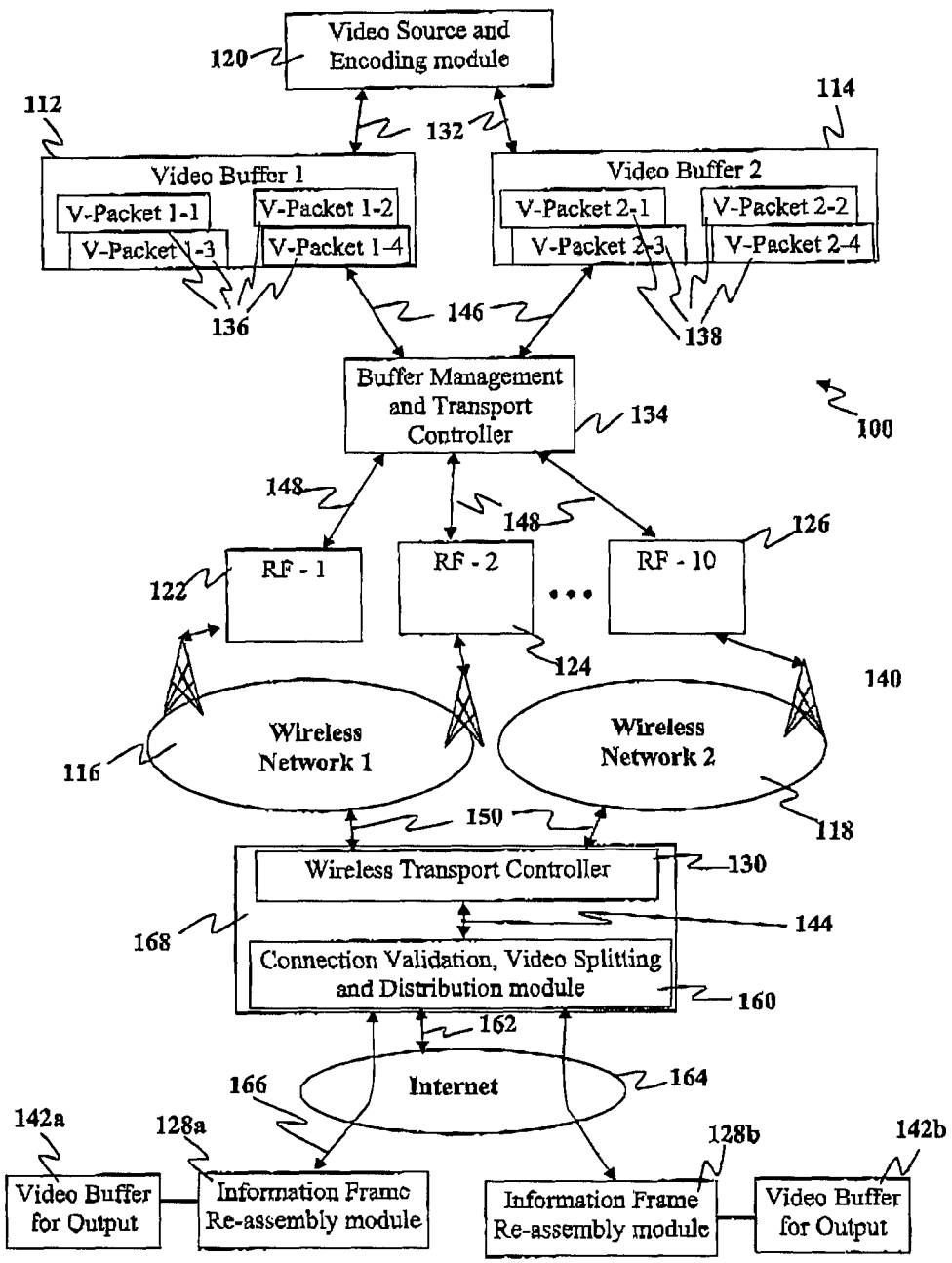
FIG. 2 is a block diagram of another exemplary system.

FIG. 2 illustrates a block diagram of another exemplary system 100 with multiple Video Buffers 112, 114 using multiple wireless networks 116, 118 to transmit, via a link 150, the video information to a distribution point 168 where it can be split for distribution. In this embodiment a Wireless Transport Controller 130 is coupled with a Connection Validation, Video Splitting and Distribution Module 160 (referred to as a Distribution module 160), via a link 164. The Distribution module 160 acts as a central hub for dealing with the distribution of Video Buffers 112, 114 to a large number of possible Information Frame Re-Assembly components 128a, 128b. This distribution point 168 is coupled to a wide area network like the Internet 164 via any well known high-speed link 162 for example, T1 lines running megabit or gigabit speeds. The distribution point may be directed coupled to at least on Information Frame Re-assembly module through a link 166.

The Information Frame Re-assembly components 128a, 128b could include cable stations, news outlets, Internet content centers, streaming Internet distributors and a wide range of existing and future distribution options. The Information Frame Re-assembly component is also connected to a video buffer 142 which is adapted to output or display the video or other data. In FIG. 2, various elements of the system are consistent to FIG. 1, but the Wireless Transport Controller 130 is centralized in a way that allows received V-Packets 1-1 to 2-4 136, 138 to be split, distributed and seen by a wider audience over a wide area connection network like the Internet 164. Distribution over the Internet 164 allows for quick worldwide distribution of real-time data from mobile camera collecting news and real-time events throughout the world. Another advantage of this embodiment 168 is that connections can be authorized, paid for and validated at any time. This system may allow new distributions to be more easily added to existing content with less negative impact on the overall system. Connections between the Information Frame Re-assembly components 128a, 128b would take place using common TCP/IP based protocols 166, such as real-time streaming protocol (RTSP) and real-time messaging protocol (RTMP), which are easily able to distribute audio and video content. Such distributions are well known in the industry and have far fewer problems than ensuring the reliability of the data reception over the Wireless Networks 116, 118 that were used to collect the data in the first place.

The centralized Information Frame Re-assembly component allows for remote management and control of the mobile unit. In addition to status information, the central control pushes configuration instructions to the mobile unit, directing operation, which input/output to use, general quality settings, etc. The central control is capable of remotely configuring both the directly connected for example the mobile transmitter or Buffer Management and Transport Controller 134, to the server and those that route through the central systems, for example Information Frame Re-assembly module 128a, 128b.

As in FIG. 1, a Video Source and Encoding module 120 contains data that is distributed to the video buffers 112, 114 through a link 132. The Buffer Management and Transport Controller 134 receives the buffers through a link 146 and distributes the data to a plurality of RF modules 122, 124 and 126. The RF modules 122, 124 and 126 transmit the data to a base station 140 on range of a wireless network 116.

Figure 3:
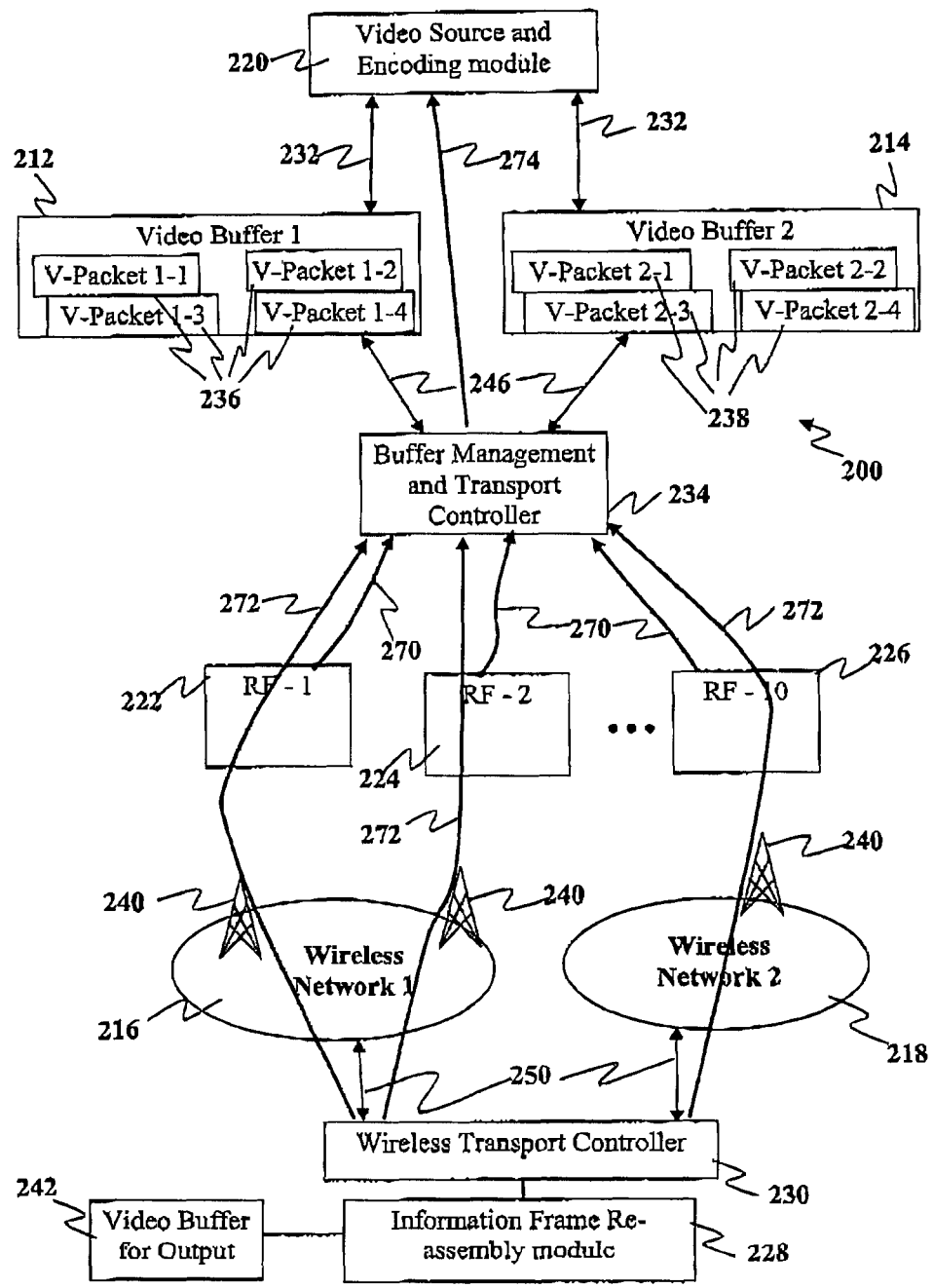
FIG. 3 is a block diagram of yet another exemplary system and feedback that can occur within the system.

FIG. 3 illustrates a block diagram of yet another system 200 and the feedback that occurs within the system 200. The system has a video source encoding module 220 which relays video or other data via a link 232 to video buffers 212, 214. The system 200 further includes a Buffer Management and Transport Controller 234, which access the video buffers 212 and 214 trough a link 246, attempts to deliver V-Packets 1-1 to 2-4 236, 238 to an Information Frame Re-assembly module 228. Various failures and issues may take place along the delivery path. In an exemplary system that uses Wireless Networks 216, 218 as part of the delivery path these failures may increase in frequency and seriousness as compared to a wired connection. In one case, the first set of failures may occur as all attached RF modules 222, 224, 226 attempt to wirelessly transmit the V-Packets 236, 238 to a specific base station 240. Base stations 240 experience frequency congestion issues, as the RF module 222, 224, 226 move, the coverage indications and receive signal strength indicator (RSSI) can show degradation in link quality and its ability to receive the information. Errors due to spontaneous congestion may occur when an increase of wireless mobile devices wish to transmit at the same time. All of these failures, indicators and congestion issues result in the RF modules, i.e. RF-1 222, RF-2 224 and RF-10 226 sending signals 270 back to the Buffer Management and Transport Controller 234.

For V-Packets 236, 238 that make it across to the base station 240 there is still the transmission of information across the Wireless Network 216, 218. Within the Wireless Network 216, 218 an additional set of failures can occur. These failures can result from congestion issues within the Wireless Network 216, 218, lost packets, damaged packets that can not be understood and a range of other internal issues. As the Information Frame Re-assembly module 228 receives V-Packets 236, 238 it can infer which V-Packets 236, 238 did not make it across the Wireless Network 216, 218. The Buffer Management and Transport Controller 234 can also write a time stamp into each V-Packet 236, 238 just before it performs the transmission to the base station 240. This time stamp can then be used by the Information Frame Re-assembly module 228 to determine how long each V-Packet 236, 238 took to make it across the various hops to reach the base station. This one-way transmit time can then be used to determine if the Wireless Network 216, 218, the base station 240 or the link to the Wireless Network 250 is bottlenecked and may cause unusual delays in reception of the V-Packets 236, 238. This information and statistics regarding the transmission is collected by the Information Frame Re-assembly module 228 and transmitted back as a status message 272 to the Butter Management an Transport Controller 234. Further status messages may be relayed similarly from the RF modules.

With all this status information 270, 272 returning to the Buffer Management and Transport Controller 234, the Buffer Management and Transport Controller 234 has the ability to make decisions intended to improve the overall continuity of V-Packet 236, 238 information flow over each attached RF Module 222, 224, 226. Since there can be any number of RF modules 222, 224, 226, this decision making ability can relate to specific feedback paths. For example throughput calculations for V-Packets 238, which could be sent through RF-10 226 into Wireless Network 2 218 and over link 250, could be taking ⅓ of the time for V-Packets 236 shipped over Wireless Network 1 (216). This information is taken into account when the Buffer Management and Transport Controller 234 merges all feedback information into a common feedback 274 to the Video Source and Encoding Module 220. The Video Source and Encoding Module 220 could be told to limit the amount of video buffer data 212, 214 it generates and stores into the buffer area. Image quality is reduced or degraded or it can be increased and improved in various different ways. Some of these ways include scaling down the image, which results in a generalized loss of quality over the entire frame. Alternatively the amount of video buffer 212, 214 can be reduced by decreasing the encoding bit rate, which tends to affect areas of higher movement or the frame rate can be decreased or increased. By adjusting the encoding and frame rates the number and quality of video images encoded changes, thus affecting the information encoded into the video buffer. A significant decrease in the encoding rate will eventually create a visibly degraded image at the receiving end.

The Buffer Management and Transport Controller, as shown in FIGS. 1, 2 and 3, uses several factors to determine if the capacity of a particular RF channel has changed (either increased or decreased) including, but not limited to, network latency; connection RSSI; packet delivery failure; delivered bit rate compared to sent bit rate; and pending data (backlog).

In regard to network latency, the current network latency can be measured for example by synchronizing the clocks between the client and the server and continuously measuring the delay introduced by the network in delivering all packets. Once the latency is known, the Buffer Management and Transport Controller can use the Information to determine whether an RF Connection is behaving well, compared to another connection or compared to the connection itself. For example, if the connection was compared with itself, the current network latency may be compared to the latency in the past X seconds, where X is a predetermined number used for the comparison. A poorly performing connection may have a highly variable latency that increases as the traffic rate increases, or may have a latency that is simply too large for the channel to be useful, for example an approximately 2 second delay in short latency mode with a 1.5 glass-to-glass latency. For instance, each active audio/video stream has an associated end-to-end (or glass-to-glass) latency—the configured time delay between when the image was captured by the camera and when it is actually delivered to the video buffer for output. If the network delay of a particular RF interface increases significantly such that the glass-to-glass latency is threatened, that RF interface is either deprecated or shut down entirely to prevent the stream from being corrupted. This is particularly an issue for transmissions using an extremely short glass-to-glass latency, for example, less than approximately 2 seconds. Also, during transmission, if the network latency increases beyond a configured tolerance, it is also possible that the RF interface is sending more data than the network is capable of delivering or data is backing up inside the RF interface/network. In this circumstance the Buffer Management and Transport controller may decrease the amount of data the RF interface/network is allowed to transmit. When the latency returns to normal, the Transport control may allow the RF interface to carry more data. The Buffer Management and Transport controller also uses the measured network delay to anticipate lost packets and retransmit them before the output video buffer misses them. If a packet hasn't been delivered and the time passed is longer than the network latency at the time that the RF interface sent it, the packet is considered lost. Also, if the packet is reported lost and the scheduled play time for the packet is close to the network delay of the fastest RF interface, in other words, the RF interface with the lowest network delay, the packet is assumed lost and resent.

Connection RSSI may aid in determining whether a specific channel is actually available.

Packet delivery failure is the rate at which packets are lost when sent via a particular RF interface. The status packets sent back to the Buffer Management and Transport Controller include statistics regarding the number of packets lost in a particular interval. The status packets also identify particular packets not received. These packets are resent in a timely manner to prevent the received stream from failing/breaking up due to missing information (a dropped frame). An increasing packet delivery failure rate is an indicator of an unstable/unreliable RF interface and the associated bit rate must be decreased.

Regarding delivered bit rate compared to sent bit rate, the amount of data sent from the transmitter is compared to the reported volume of data received by the server. The goal ratio for any given period should be close to one which would indicate the server received all of the data sent by the transmitter. In typical operation, a ratio of 90% is enough for a healthy connection. If the ratio is too low, then the network connected to that particular RF interface is not reliably transmitting data as fast as the RF interface is sending it. When this circumstance occurs, the RF interface may decrease its transmission rate and allow the network to catch up. Synchronized clocks may be used for this comparison as the transmitter and receiver are intending to compare equivalent windows in time.

In an alternative embodiment, a mechanism may instruct the network to allocate more bandwidth to the wireless mobile device transmitting data. For example, in a network having a Quality of Service agreement, an indicator or trigger may be included that would indicate the desire to provide greater bandwidth for the ongoing transmission. This added mechanism may require further modification on the typical Quality of Service agreements currently in place.

Pending data (backlog) is the queue of packets awaiting transmission over any of the available RF interfaces. The Transmitter control knows the current transmission rate of all connected/operating RF interfaces. The volume of data to be sent which would include continuous data generated by the source plus any packets that were detected/reported as lost. The presence of backlog does not necessarily require an immediate adjustment to the encoding bit rate by the Video Source and Encoding Module 220. For longer glass-to-glass latencies, the Information Frame Re-assembly Module 228 will have more audio/video data buffered, which gives the RF interfaces more time to attempt to clear the backlog without a reduction in encoding bit rate.

The audio encoding bit rate is much smaller relative to the flow of video information and is unlikely to have an impact on the system's ability to transmit a data stream. There may be little benefit in attempting to limit the audio signal bandwidth in order to preserve signal integrity.

Many other factors could affect how the Buffer Management and Transport controller 234 sends status signals 274 onto the Video Source and Encoding module 220. The examples provided above are not meant to be exhaustive but representative of possible signals and failures to create feedback in the system. The Buffer Management and Transport controller may further include a storage component where information and other factors relating to the transmission are stored for later analysis.

Figure 4A:
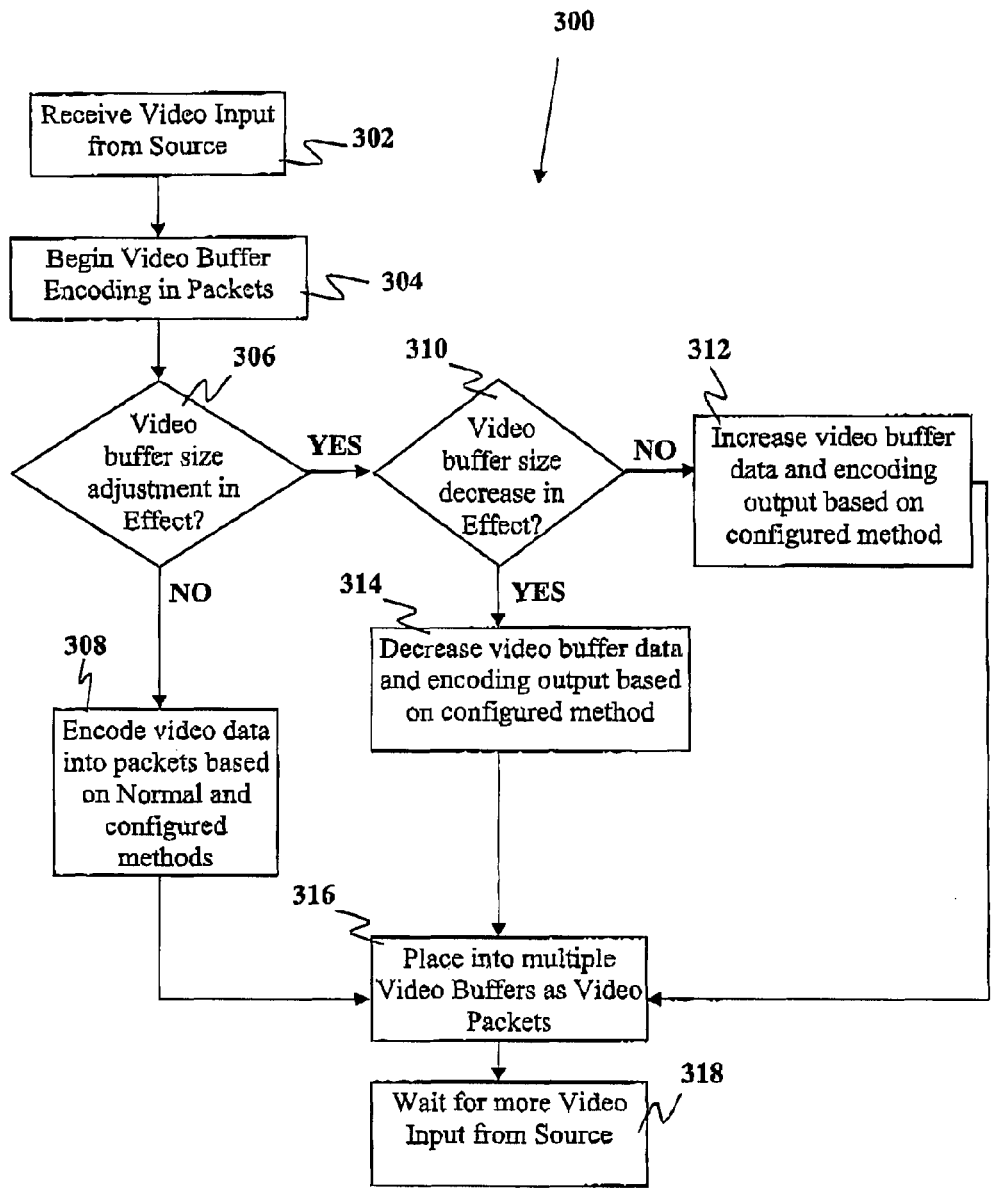
FIGS. 4A and 4B are flow charts showing a method of video source scaling.
Figure 4B:
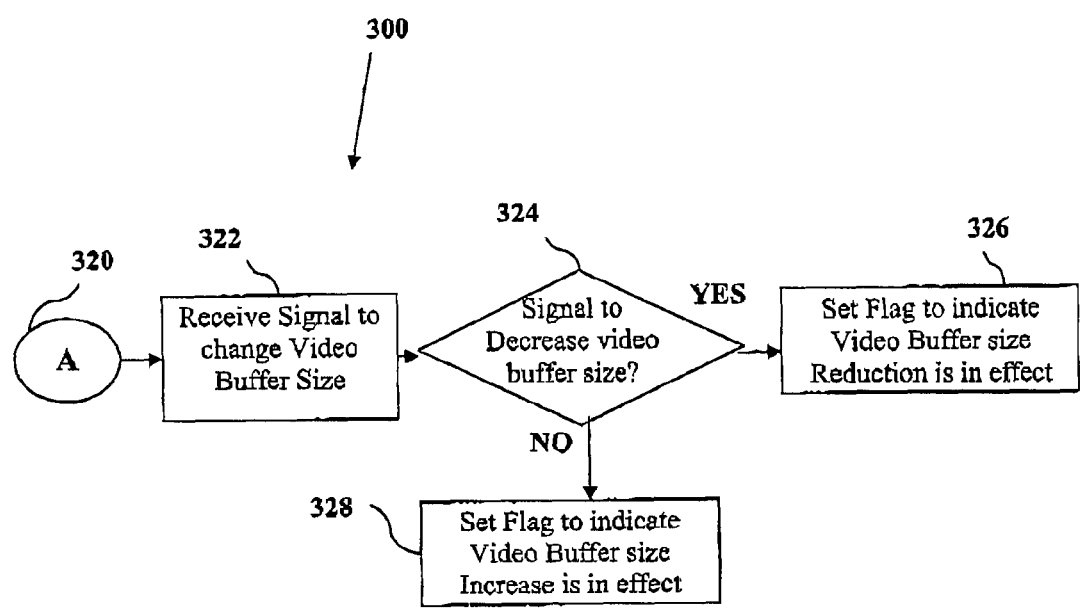

FIGS. 4A and 4B provide a flow chart of a method of video source scaling 300 within the Video Source and Encoding module. This flow chart represents a small part of the overall functionality of the Video Source and Encoding module. Video input is received from a source 302. As described above, the video input can be from a range of different sources and can be broadcast quality video, high-definition, ultra-high definition or some further large sized video data. At the start of the process the video buffer encoding component 304 takes charge of the data and determines if there is any video buffer size adjustment in effect 306. Dynamic video size adjustment is an exemplary method for increasing or decreasing the amount of data that must be transmitted wirelessly. If video buffer size adjustment is not in effect then regular encoding of the video data takes place 308 into video packets based on the normal and configured methods. As mentioned these methods include, for example, compression, for example, MPEG or other methods, encryption if required and packet splitting to move data through multiple video buffers for different Wireless Networks.

If video buffer size adjustment is in effect then a further check is performed to see if video buffer size should be decreased 310. A video buffer size decrease is not in effect then the video buffer encoding can be increased based on the buffer size adjustment flag. The amount of adjustment is based on the improvements in the parameters being monitored. These parameters can include RSSI, base station saturation values, transmit failures, congestion values through the network, received latency by the remote receiver and many other similar parameters. When these values are analyzed against their previous values all improvements are compared and a determination is made using high and low water predetermined values. As values increase above thresholds then the amount of data can be increased. The method for increase 312 may follow the configured method used for decreasing the video buffer output. Methods to increase video image data quantity can include methods like: scaling up the image, which results in a generalized improvement of quality over the entire frame, by increasing the encoding bit rate, which tends to improve areas of higher movement, or the frame rate, can be increased.

If a video buffer size decrease is in effect 310 then the amount of data saved into video buffers is decreased 314. This decrease follows the configured method that is being used within the system. As discussed above, the method for decreasing can follow the configured method used for increasing the video buffer output. Methods to decrease video image data quantity can include methods such as scaling down the image, which results in a generalized decrease of quality over the entire frame, by decreasing the encoding bit rate, which tends to negatively affect areas of higher movement, or the frame rate can be decreased which can lead to jumpiness.

Once the amount of encoded data is determined to be unadjusted 308, increased 312 or decreased 314, the data is then placed into multiple video buffers 316. Once the buffers are written the system for transmitting returns to wait for additional video data from the input source 318.

To assist in the determination of when to adjust video buffer output the Video Source and Encoding Controller receives a signal (A) 320 from the Buffer Management and Transport module. The received signal indicates a video buffer size change is required 322. A check is made to determine if the size should be decreased 324. If the size is to be decreased a flag or other indicator is set to indicate that the video buffer output should be reduced 326. Otherwise the flag is set to indicate that video buffer size should be increased 328.

Figure 5:
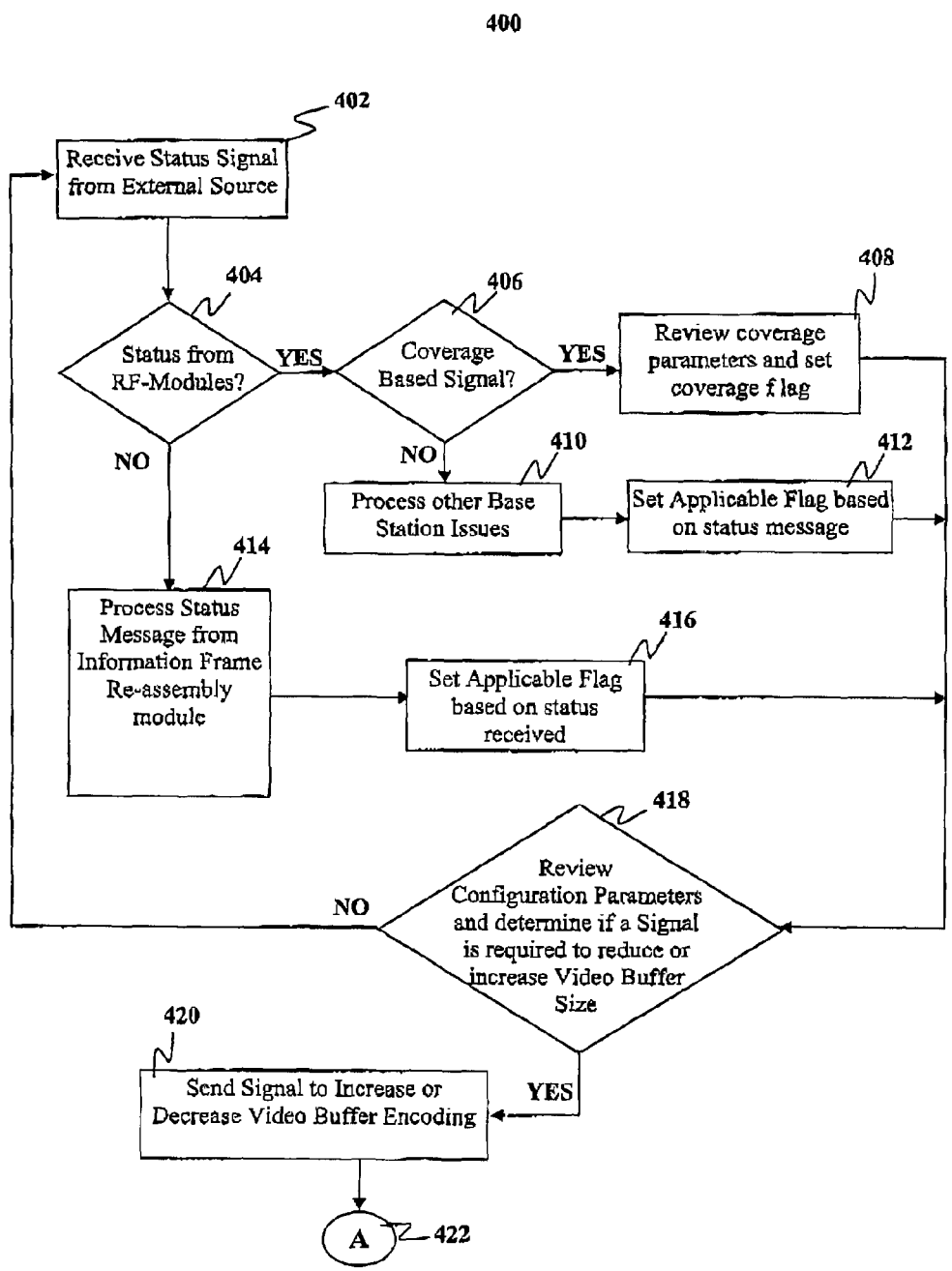
FIG. 5 is a flow chart showing another method of video source scaling.

FIG. 5 provides a flow chart of a method of video source scaling 400 within the Buffer Management and Transport module. This flow chart represents only one aspect of the overall functionality of the Buffer Management and Transport module. First, the Buffer Management and Transport module receives status signal information 402 from an external source. As previously shown, these sources may be RF modules or remote wireless transport controllers. If the status is from an RF-Module 404 then various indicators are checked. There are other possible indicators only a few indicators are shown in this flow chart for readability. Status messages or indicators are feedback that can be related to the current (or active) video stream, client state, network state, remote server/network state and/or wireless status. Current video stream state messages include statistics related to, for example, the current transmission, including received bit rate, sent bit rate, lost packet rate, packet interval times, last sent time, clock status, bytes sent and received, buffer sizes, latency statistics, current length of buffered data, and the current glass to glass delay. Client state messages notify the Buffer Management and Transport controller of configuration changes in the central control. Network state information includes applying weighting to networks which may allow preferential treatment, for example, some networks may be preferred due to cost and/or business agreements. Remote server/network information includes statistics about the endpoint, whether the remote IFR is in use, bandwidth limited, available resources, such as disk space and processing power, and other end point information. Wireless status includes information related to the general health of the connected wireless networks such as reliability, throughput, historical behavior, and configuration.

As an example, the coverage signal RSSI is checked 406 to see if the range has changed considerably. This check can be based on a previously saved value from this RF-Module, it can include a high and low water threshold change value, or that minor changes are ignored. If the coverage indicator has changed significantly for better or worse the coverage parameters are checked 408 and a flag is set to indicate whether the change is significant enough to require amending some transmission parameters. The flag might indicate the level has dropped considerably or has increased considerably, or separate indicators may be used.

If the signal from the RF-Module is not coverage related then a range of other possible base station issues are checked 410. This could include base station congestion factors, transmit failure attempts, dead zone indicators, base station handoff protocols in effect or other such wireless network anomalies. Once these are checked and analyzed the applicable flag is set 412 based on the status message and threshold levels. The flag could indicate conditions have improved or degraded.

If the status message is not from an RF-Module 404 then the status message may be from the Information Frame Reassembly module. This status message could indicate a change in the receive frequency in video packets, either better or worse reception or it could indicate congestion issues have changed for better or worse, or it could indicate many other conditions have changed in packet reception, for example, lost packets, packet delivery rate, current network latency/delay, received bit rate (bps) synchronized with sent bit rate, etc.

Based on the status message and various threshold conditions the theoretical bandwidth of the RF connection is recalculated. If the aggregate calculated bandwidth for all connected RF connections has changed, the applicable flag is set to indicate an improvement or degradation of video buffer transfers 416.

Once this review of the status message is complete and the appropriate indicators have been set, a final review of the system changes is made 418. Within the final check all flags are reviewed against a preconfigured high or low water threshold mark to determine whether a sufficient change in the transmission by the system has been detected. Although a low-water and high-water threshold mark technique is discussed here many other methods could be used to determine whether the detected changes in video buffer transfers are significant enough to alter the video buffer output. Based on this determination a signal to increase or decrease the video buffer output is sent 420 to the Video Source and Encoding module and it connects through (A) 422 to FIG. 4.

Further Details Regarding the Present Invention

As noted above, when wireless mobile devices such as smart phones, super phones, tablets and other mobile computing devices are used as the video recording device for recording a high volume of data (e.g. high definition video), it is generally not possible to stream the data live due to limitations in transmission capacity over conventional network connections. The available networks may be limited to either a single cellular network modem, possibly paired with a built-in local RF network (e.g. Wi-Fi). Even 4G Long Term Evolution (LTE) networks offering significantly higher transmission speeds may not be able to consistently and reliably transmit a high volume of data such as live high definition video due to fluctuations in network capacity and the reliability of the network connection. Also, local RF networks have a limited range and a restricted number of access points.

To address this problem, in one aspect, a computer system and computer implemented method is provided for transmitting data from a wireless mobile device, accessing one or more additional WAN connections via the local RF network, as will now be described in detail, in one example of the implementation of the MWR technology previously described.

For understanding the particular embodiments of the invention to be described, certain definitions are provided.

WAN—Wide Area Network—any connected network with access to the larger Internet. Connection to a WAN can either be wireless (e.g. cellular) or wired (Ethernet).

Local RF Network—A wireless network used to connect nearby devices. The network can be ad-hoc or hosted by a hot-spot. The local RF Network may have a connection to the larger Internet. Wi-Fi (802.11a/b/g/n) is an example of a local RF network.

Router—a component used to direct data packets between networks. Routers generally follow a rule set to determine the destination for any given data packet, typically based on either or both of the data packet source and destination addressing. A Routing Module is a representation of a physical router. The "router" in the examples provided below refer to one or more components that implement the multipath router or MWR functionality described previously.

Generally speaking, current wireless mobile devices may have two possible ways to wirelessly transmit data, namely cellular wide area network (WAN) (e.g. 3G+/4G/LTE), or to a local RF network (e.g. Wi-Fi). Some devices have both, while other devices may be restricted to one or the other. Based on currently available technologies, Wi-Fi is generally capable of greater bandwidth, of 10 Mbps, 100 Mbps, or even more. However, the range of Wi-Fi is limited to a local area made available by Wi-Fi hot spots, such as may be found in a home or a business. On the other hand, cellular networks allow a vastly greater area of coverage and extended range, but generally have limited bandwidth.

In order to overcome the limitations of cellular only connections, the present system and method takes a high volume stream of data (for example data recorded by the wireless mobile device) and splits the data into a plurality of streams, for example using the methodology as described above. The multiple data streams can be transmitted via a local RF network to one or more peer devices (or laborers).

The laborer devices can direct the data traffic to an associated WAN interface. Where the laborer device hosts multiple WAN interfaces, a routing utility or module directs the data traffic based on either implicit or explicit instructions from the transmitter. Implicit instructions may be a simple as rules based on packet addressing. In one embodiment of the invention, the routing module may be implemented using an IpTables service, which is built into most Linux distributions. Other embodiments may use network tunneling techniques (PPTP, etc.) to ensure a particular data packet is delivered to the correct WAN interface.

A routing module in accordance with the present invention can separate the data packets and direct them to the appropriate WAN interface based on directions from the Buffer Management and Transport Controller. Routing may occur before the local RF interface (see FIG. 7 and FIG. 8), or, when the laborer device hosts multiple WAN Interfaces, on the laborer device itself (FIG. 9).

In one implementation, a WAN Discovery Utility or Module tracks the WAN interfaces (and therefore networks) that are reachable through the local RF interface. By introducing a local RF layer, WAN connections no longer need to be physically connected to the transmitter hardware. This allows an operator to connect to more wireless networks for increased reliability and throughput. The WAN Discovery Module manages the list of WAN connections available on the local RF network. Devices willing to share their WAN capacity identify themselves and are cataloged for use by the Buffer Manager and Transport Controller.

The Buffer Manager and Transport Controller module is responsible for directing the individual data packets to the appropriate WAN interface. All WAN interfaces are treated as separate and distinct connections, operating independent of each other, whether they are hosted on the transmitter, alone on a separate laborer device, or one of many on a dedicated device.

A Routing Module accepts packets and directs them to the appropriate network based on the addressing information they contain.

The Local RF interface sends and receives data packets on the local RF network. The local RF network may be connected to the larger Internet allowing a direct connection to receiver where the buffers are reassembled. In most cases, however, the Internet is only indirectly available through shared WAN interfaces.

Figure 6:
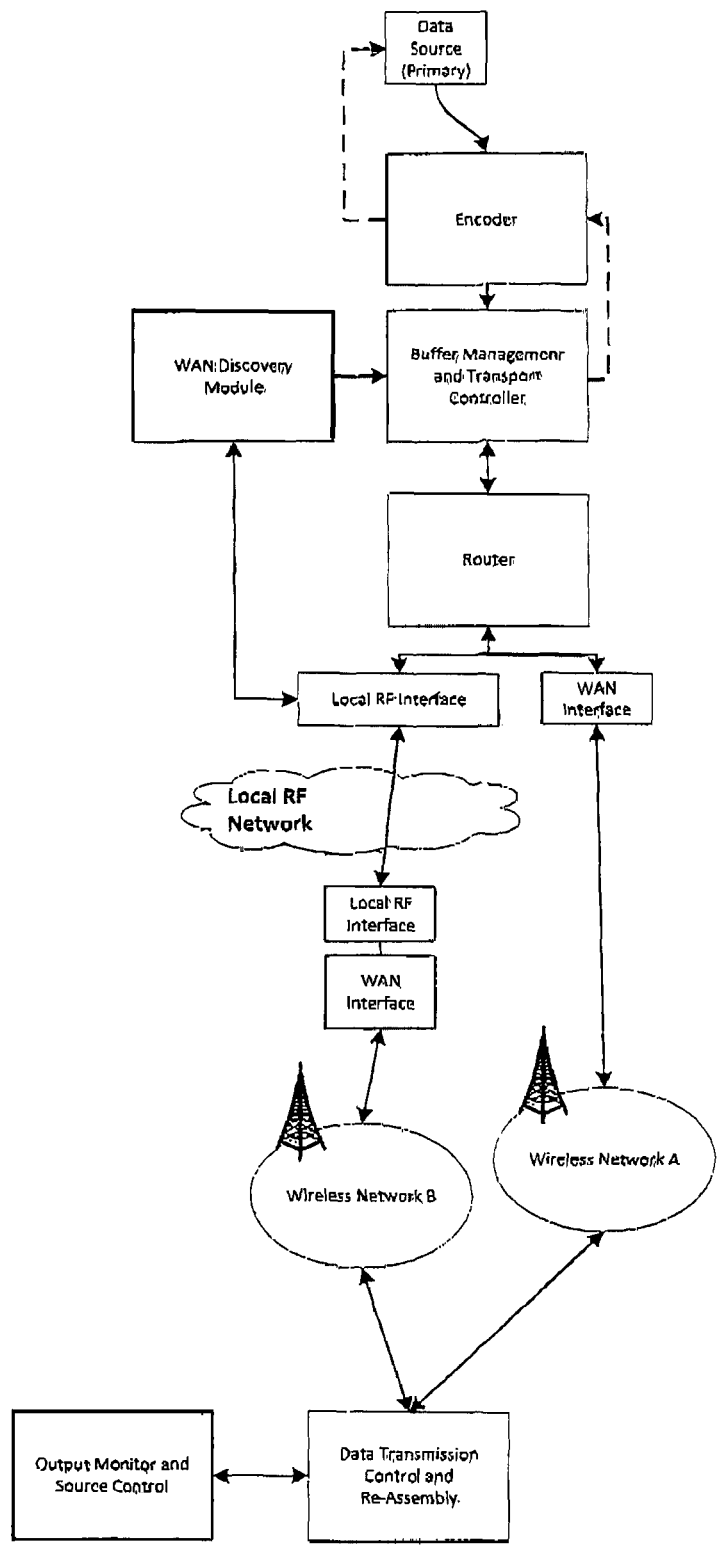
FIG. 6 is a schematic diagram showing a wireless router configuration in accordance with an embodiment.

As shown in FIG. 6, in an embodiment, given a wireless mobile device with both cellular and Wi-Fi capabilities, the wireless mobile device may be configured to use both capabilities to transmit at least two data streams: When transmitted via cellular, the wireless mobile device may use a cellular connection established over a 3G+/4G/LTE network, for example. At the same time, the wireless mobile device may be connected via Wi-Fi to a wireless router that is located within operating range of the wireless mobile device and configured with multiple network connections. The streams are directed to the receiver where the transport buffers are reassembled. When both the cellular and Wi-Fi connections are operating and the wireless mobile device is able to split the data streams over both, the throughput may be sufficient to transmit high quality video live. However, failure of one connection or the other due to a sudden change in network loading could cause the live transmission to be interrupted or to fall outright.

Figure 7:
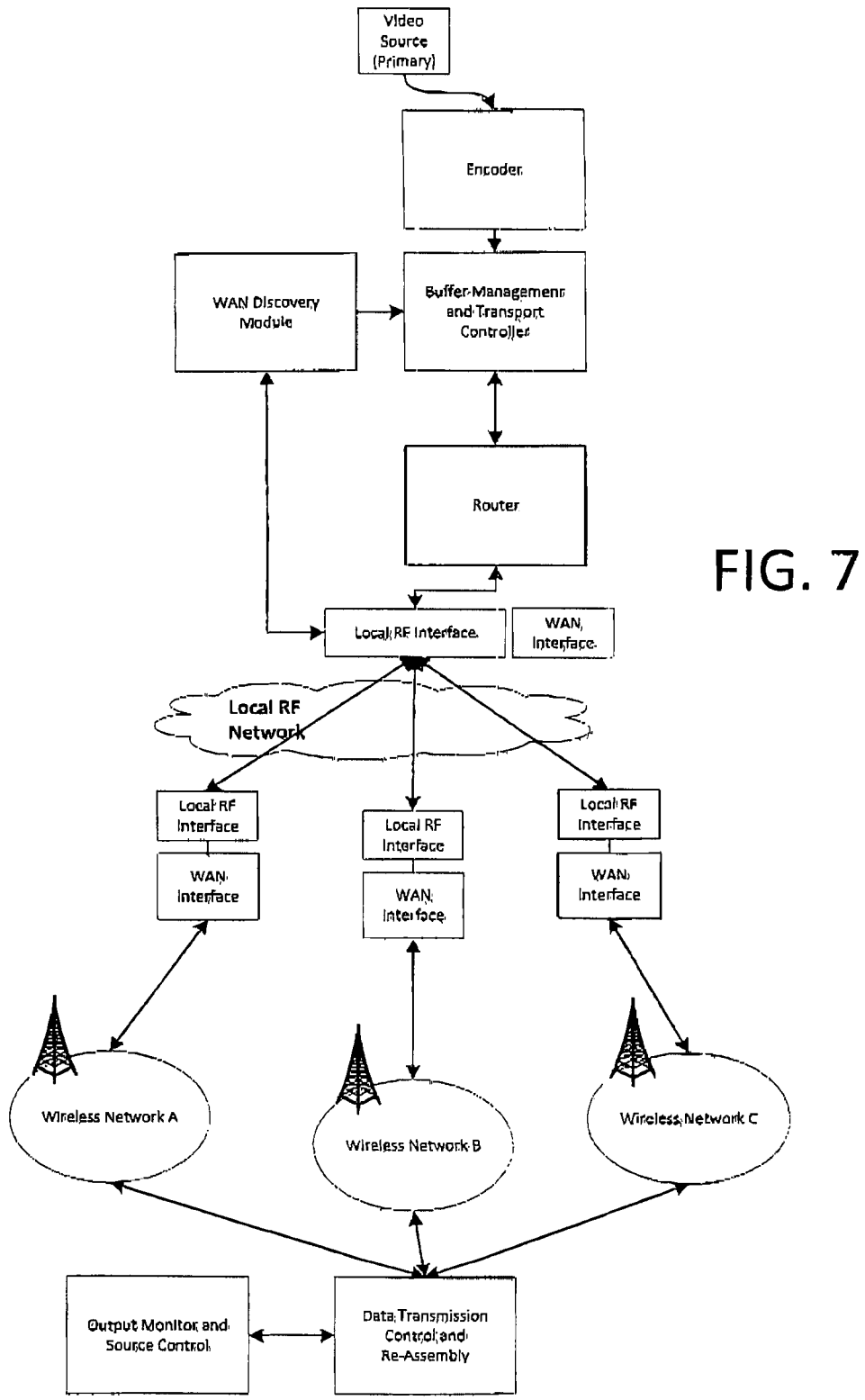
FIG. 7 is a schematic diagram showing a multipath wireless router (MWR) configuration in accordance with an embodiment.

Referring to FIG. 7, the transmitter has identified multiple possible laborer devices, each with a single WAN interface available. The transmitter's WAN Discovery Module detects each available WAN and passes the addressing information to the Buffer Management and Transport Controller (BMTC), allowing the BMTC to access them as a virtual WAN interface. The transmitter's Router module divides the data packets and directs each to the appropriate device, for retransmission on the laborer's WAN interface.

Figure 8:
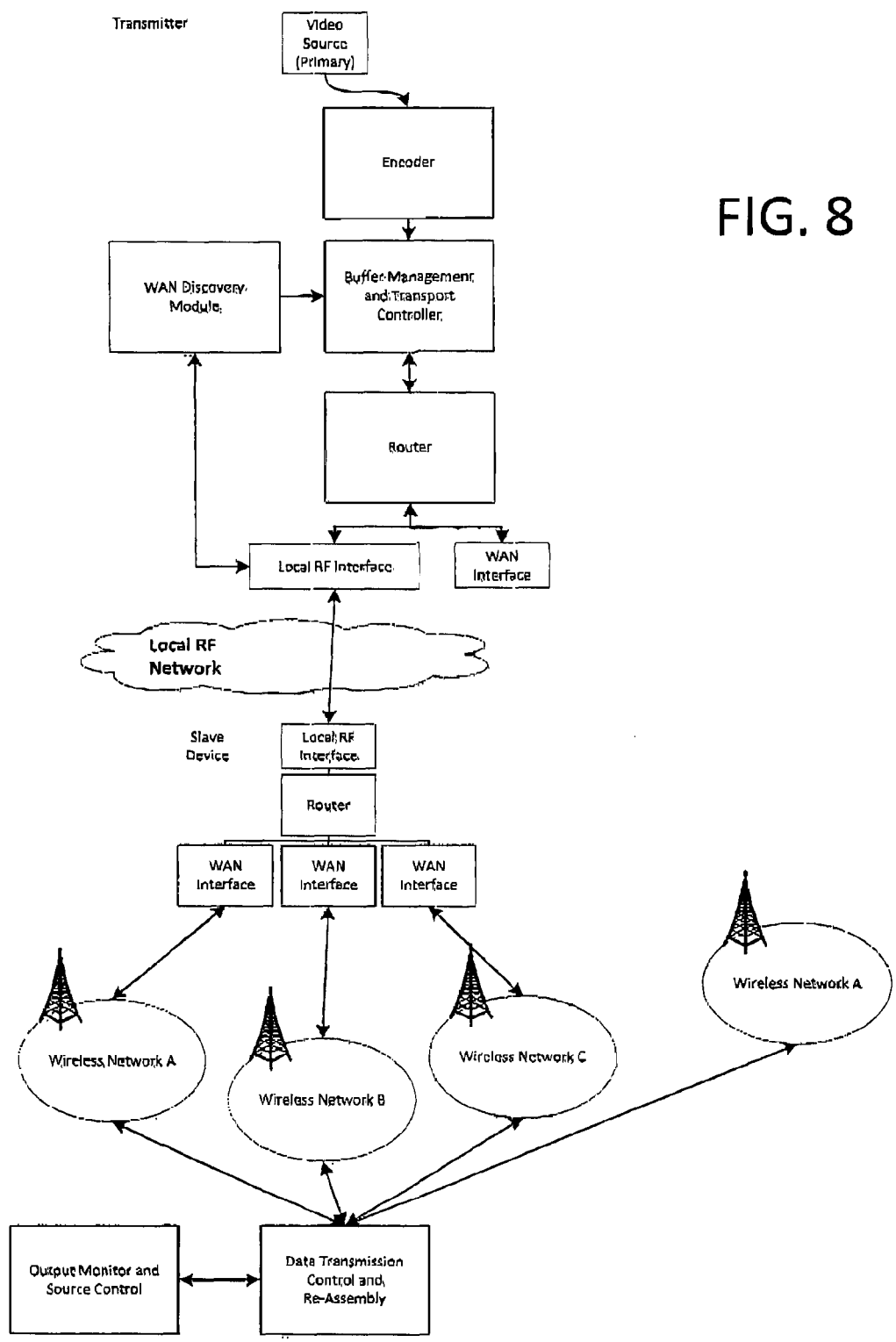
FIG. 8 is a schematic diagram showing an illustrative embodiment in which a multipath laborer device is present and able to provide multiple network connections.
Figure 9:
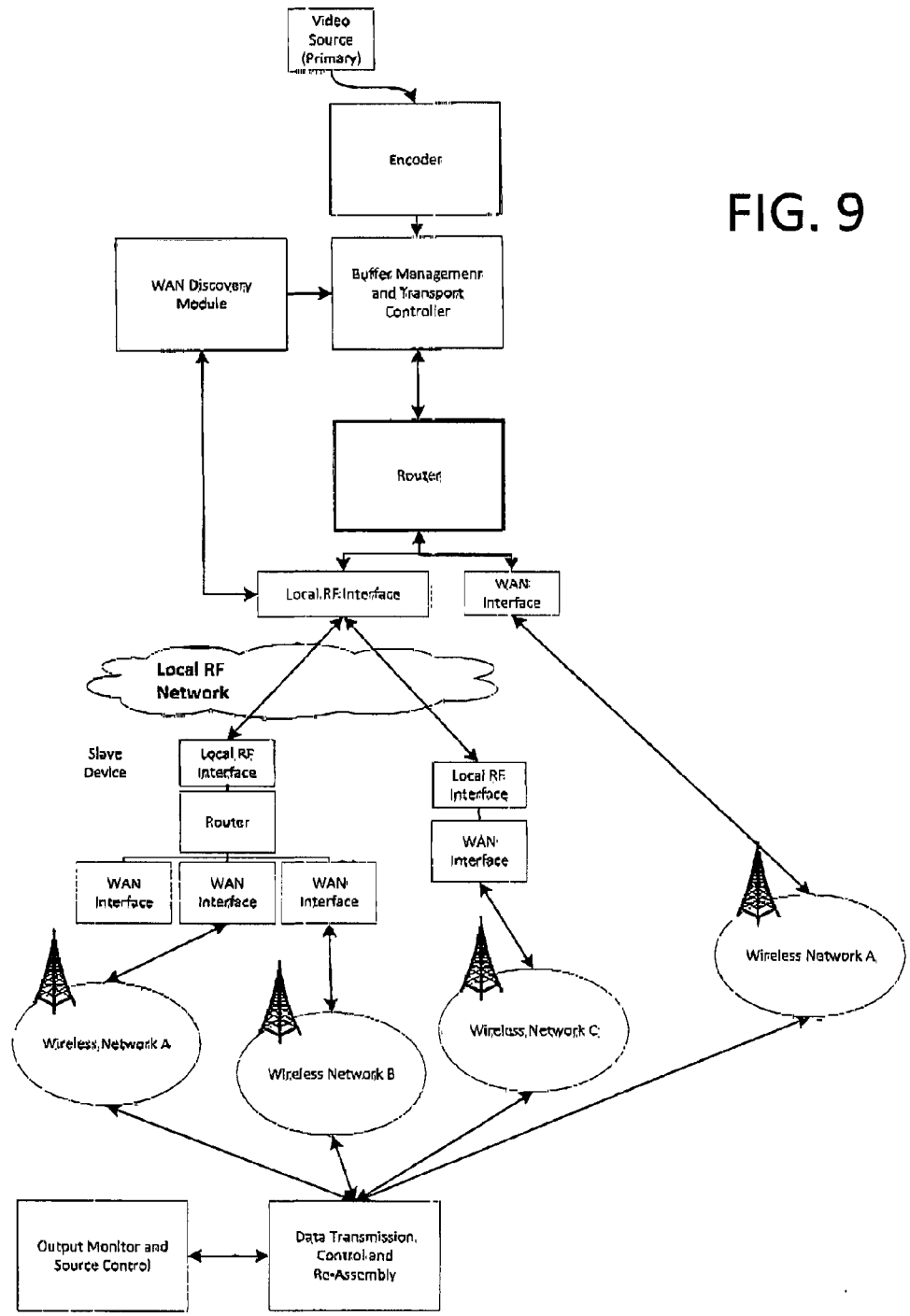
FIG. 9 is a schematic diagram showing an embodiment where both single-path and multi-path laborer devices are present.

Now referring to FIG. 8, shown is an illustrative embodiment in which a multipath laborer device is present and able to provide multiple network connections. The multipath laborer device advertises the available networks and the parameters required to make use of them, possibly through the use of advanced routing protocols. The transmitter's WAN Discovery module detects the WAN Interfaces, and passes the appropriate addressing information to the BMTC. The transmitter's router module is effectively in pass-through mode as all data packets are directed through the local RF interface to the laborer. The laborer hosts a routing module to direct the data packets to the appropriate WAN interface.

FIG. 9 depicts an embodiment where both single-path and multi-path laborer devices are present.

The operator has the option of selecting the connection method to use: cell only, Wi-Fi only, or split/shared.

In scenarios where the embedded cell connection is too expensive to use (international roaming), the Wi-Fi connection is preferred. The device uses Wi-Fi only and depends on the MWR to provide network connectivity. Not only does this allow a device not configured for a high-bandwidth plan to broadcast video, but it also works around the cell network lock restriction for those devices that would have to roam.

The information communicated by the laborer devices to the encoding module in the wireless mobile device can be used by the encoding module to encode the recorded high definition video into multiple data streams, based on the number of network connections available and the determined transmission capacity of each. Thus, the Wi-Fi connection available on the transmitter is used as a local, high-speed hop to multiple network connections with significantly increased transmission capacity.

In an illustrative application, the MWR is configured to host a web server. Once the device has connected to the Wi-Fi interface and acquired an address (via DHCP), it sends a request to the gateway address (the MWR) and queries the current the configuration. The MWR reports the number of connected WANs, identifiers and their capabilities. Each connected WAN is identified by a unique port number. The buffer controller uses this information to configure a (virtual) connection for each WAN connection on the MWR. The port number is used to route specific packets/data from the Wi-Fi interface to a specific WAN via the MWR (illustrated in FIG. 11). Data packet flow is in this case bi-directional: once a route is established outbound (from the transmitter through the MWR WAN interface), any packets received by the MWR WAN Interface are returned to the originating address at the transmitter.

Figure 10:
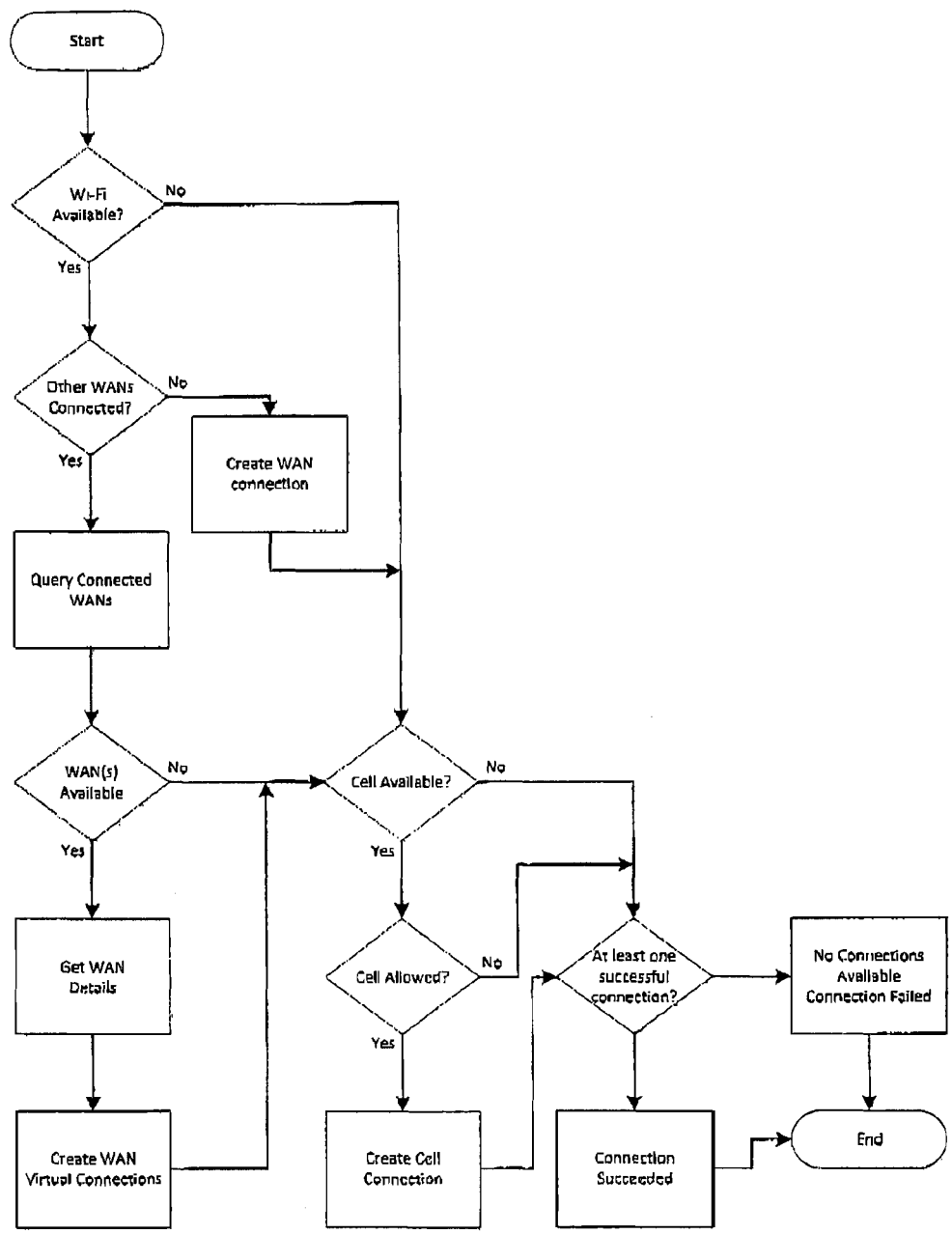
FIG. 10 is a schematic diagram showing a transmitter going through a number of steps to establish the availability of remote WAN interfaces.

Referring to FIG. 10, the transmitter goes through a number of steps to establish the availability of remote WAN Interfaces.

The wireless mobile device detects whether there is an available Wi-Fi network. If there is one (the device has connected), the device queries the gateway for connected WAN Information. This query also implicitly identifies whether the gateway is a MWR device or just a regular Wi-Fi WAN router. If the Wi-Fi is not a MWR, treat it as a regular connection and continue.

If the Wi-Fi is hosted by an MWR, the computer system queries the available WANs. For each WAN, create a virtual connection identified by the routing information provided by the MWR. For each virtual connection, an internal stream can be created.

When encoding starts, the mobile unit first verifies the available bandwidth on each connection. The connection test measures available bandwidth, transmit latency (one way network delay from the mobile unit to the receiver), and lost data. Based on these parameters, a connection suitability and ideal rate is established. The data buffers are coded with the WAN identifier, which enables connection specific routing on the MWR. The MWR is responsible for splitting the aggregate stream into its component streams and directing each one to the appropriate WAN.

Each virtual connection and therefore, each WAN, is evaluated independently for transmitter suitability. As congestion builds on one of the networks, the Buffer Manager is responsible for shift the traffic to another connection and/or reducing the quality and/or quantity of transmitted data overall.

Figure 11:
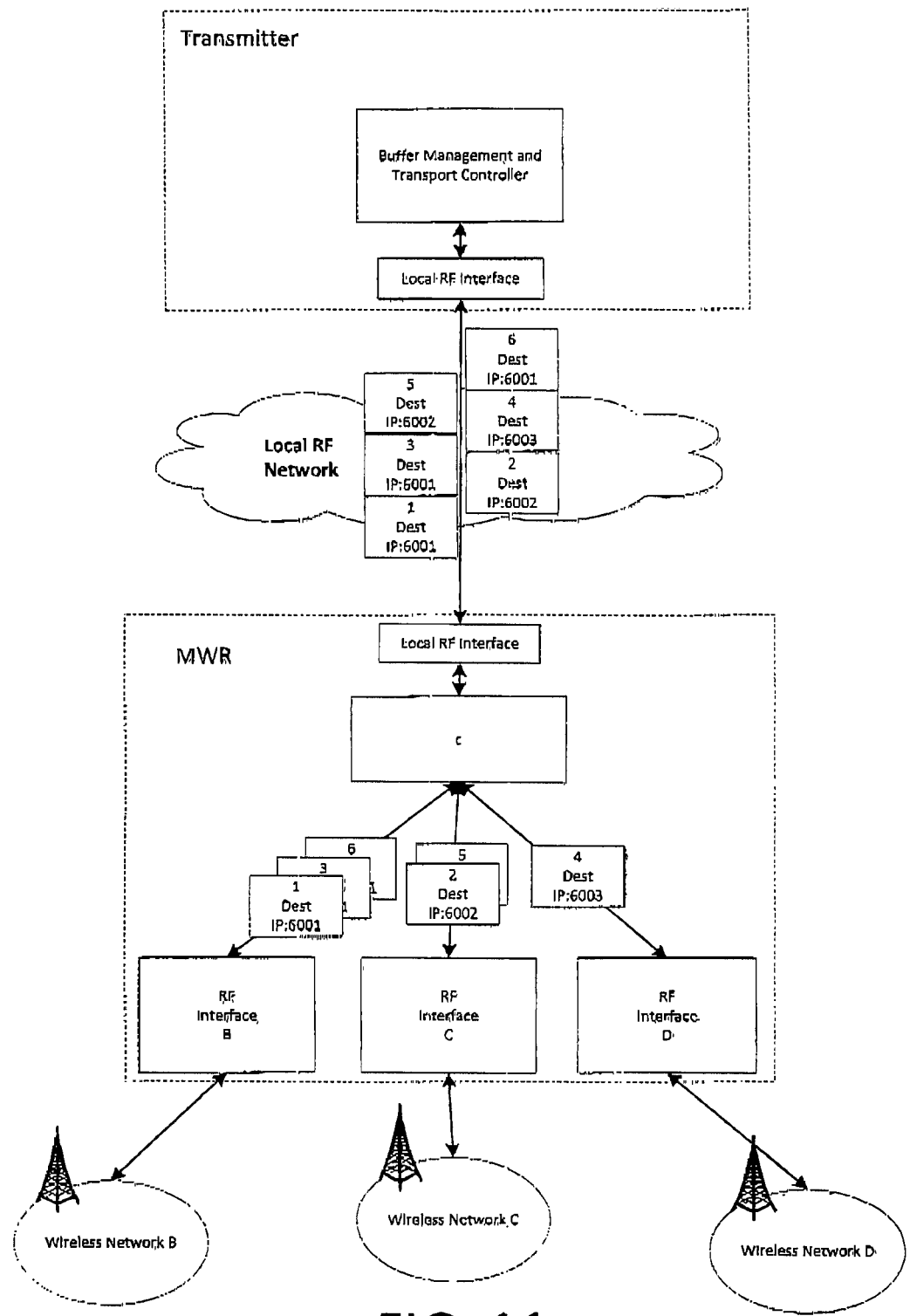
FIG. 11 is a schematic diagram of an illustrative embodiment in which there are no cellular networks directly available and three networks, and Networks A, B and C connected to the MWR.

Referring to FIG. 11, in an illustrative embodiment, there are no cellular networks directly available and three networks, Networks A, B and C connected to the MWR. When queried, the MWR instructs the mobile unit to create three connections, and to use the source address ports of 6001, 6002 and 6003 to identify each stream.

The mobile unit starts transmitting data packets, each addressed to an individual network. The MWR handles the address translation and routing based on the specified port in each individual packet. The traffic for each network is fully independent, only sharing the Wi-Fi interface bandwidth. Since the available Wi-Fi bandwidth is (or should be) greater than the aggregate bandwidth available through the connected WANs, there is little contention for local network resources.

The Buffer Manager is constantly monitoring the one way network latency of all connections. If that latency passes a threshold, or if data directed through a particular interface is not received at the receiver (Data Re-assembly module), the data rate for that connection is decreased or possibly even halted. If this occurs, the excess data packets are sent via one of the other networks (C or D). If necessary, the Buffer Manager reevaluates the current transmission bit rate and may decrease it if necessary (or make other quality/quantity changes—for example, decreasing the video resolution or, altering the recorded frame rate.

In an embodiment, if there is an active cellular connection on the wireless mobile device, one of the encoded data streams may be directed to use the cellular connection. The remaining data streams are sent to the MWR via the Wi-Fi connection. Upon receipt at the MWR, the data streams are separated and directed to the specified WAN based upon the address in each packet. The network connections used may be based considerations of reliability, capacity, and/or operator preference. For example, operator preference may allow the owner of the wireless mobile device to rank possible networks by cost of operation. However, the encoding module may be configured to override the operator's preferences based on transmission requirements for a particular data stream. If the operator has ranked the possible network connections based on cost concerns (e.g. perhaps specifying Wi-Fi only), the encoding module preferentially uses low cost networks first, only using the other network connections as may be necessary to maintain reliability and throughput. This becomes more important, for example, when a combination of cellular and satellite connections are available on the MWR, allowing the use of the cellular networks first, and only using significantly more expensive satellite links when necessary.

Figure 12:
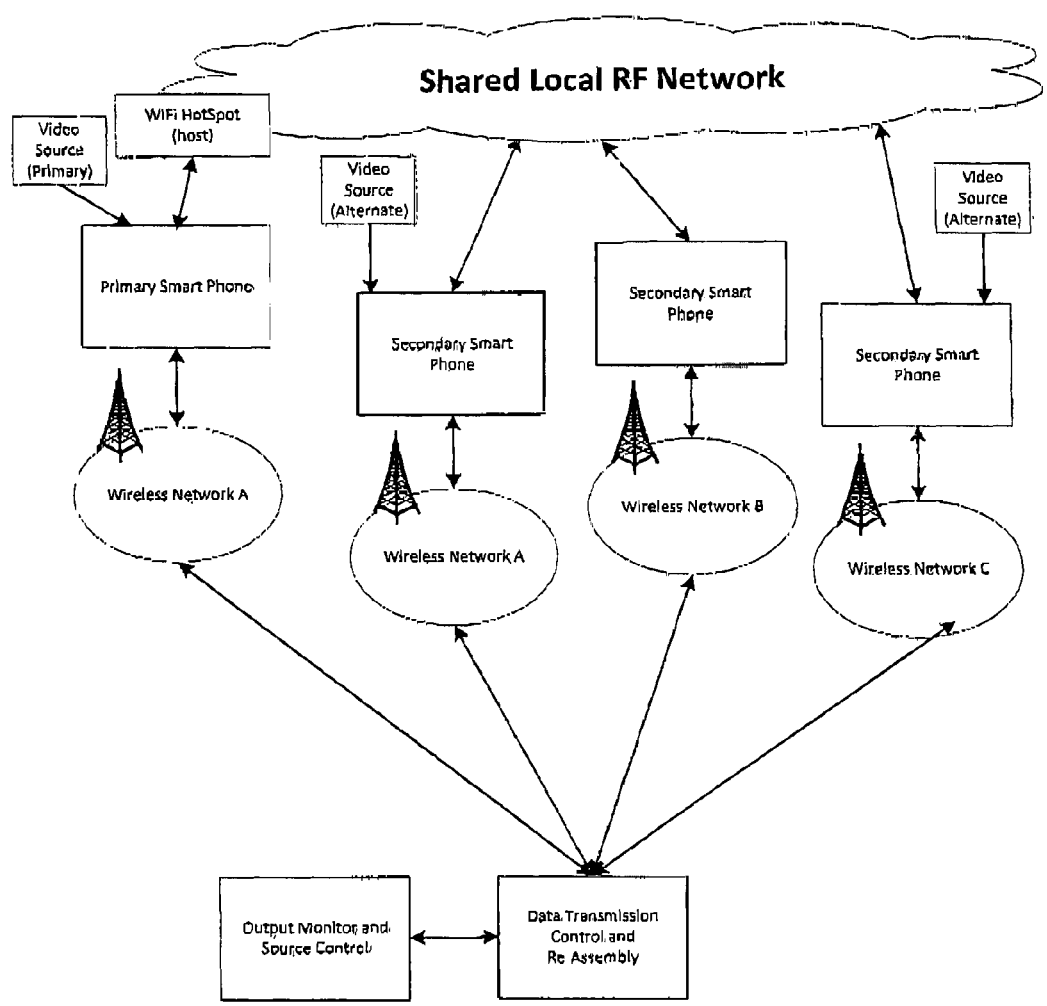
FIG. 12 illustrates a boss/laborer configuration of the present invention, in one particular aspect.
Figure 12B:
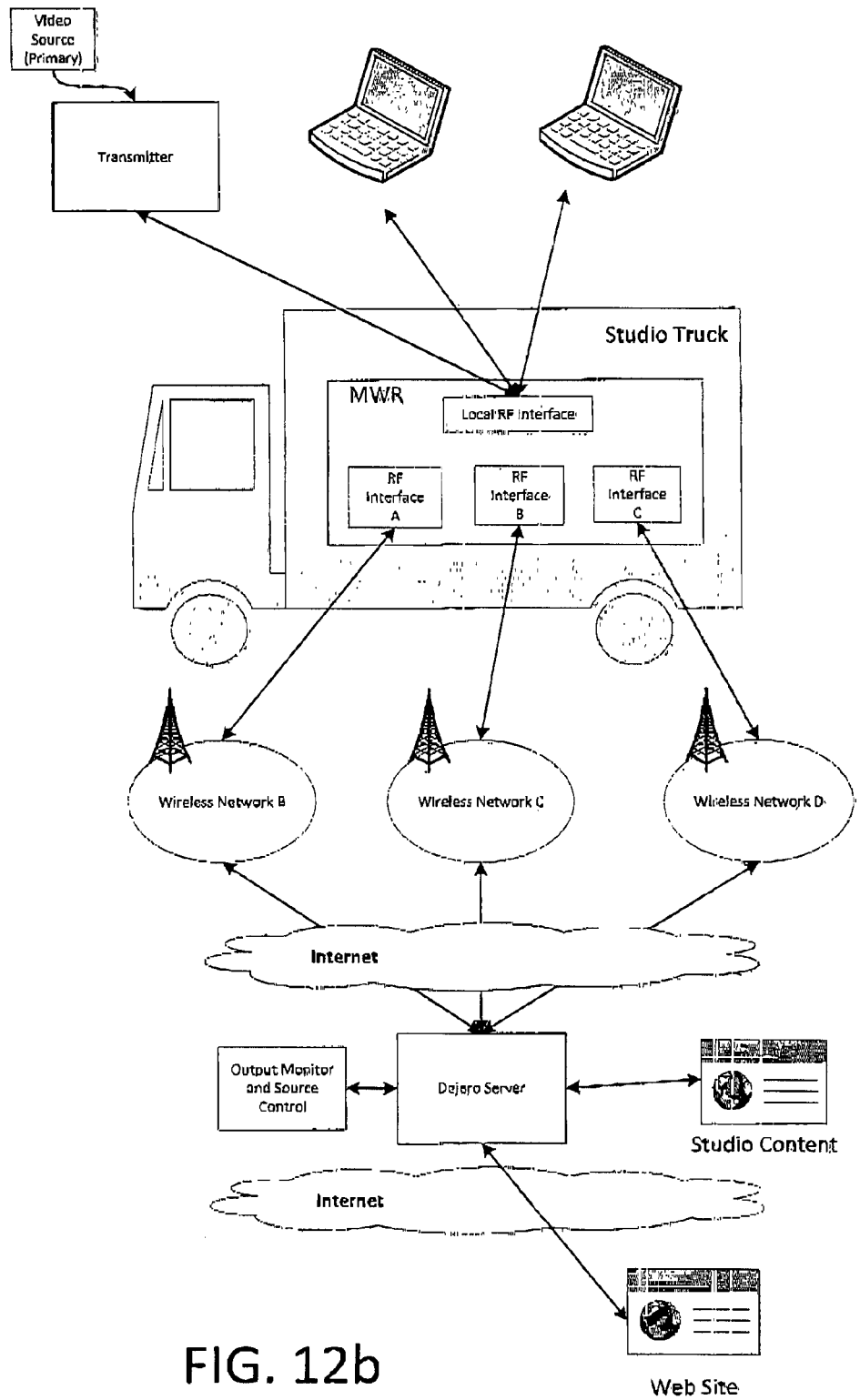
FIG. 12b illustrates a "studio truck" implementation of the present invention.
Figure 12C:
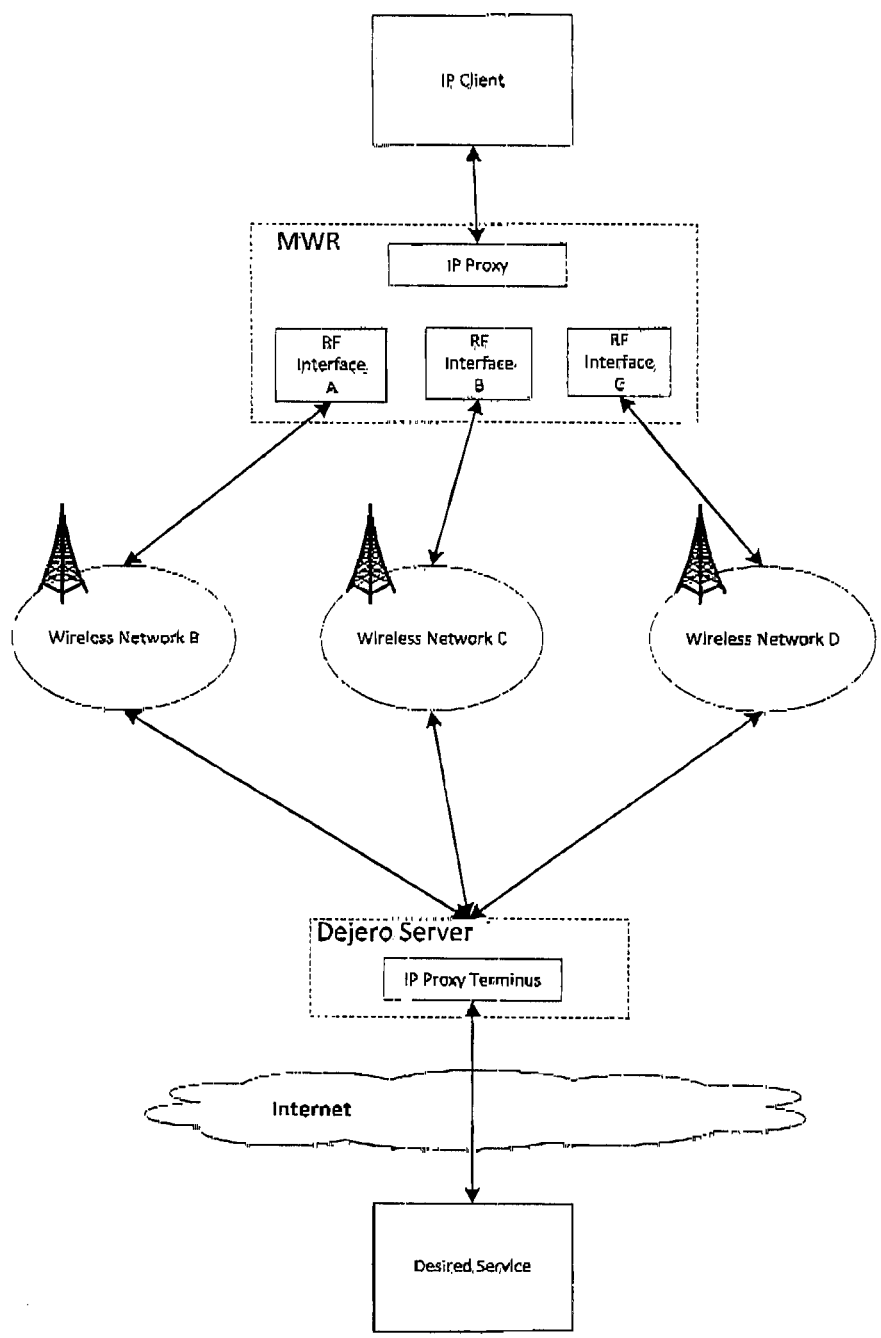
FIG. 12c illustrates a possible IP client/Internet service implementation of the present invention, with MWR providing improved connectivity between an IP client and a server computer and its associated resources.

FIG. 12b shows one possible implementation of the present invention, as part of an improved "studio truck". Studio trucks are used by various broadcasters as a mobile base of operation for example for television crews who are on location in order to gather footage and transfer footage in for example for use in live television or breaking news television applications. Television crews require high-speed access to either the Internet (for data transmission) or possibly applications in the studio itself. Typically television crews have a connected truck capable of connecting with microwave or satellite, or even using cellular networks; however, these connections either provide single device access, are expensive, or inconvenient or slow.

MWR may be installed in a studio truck and used in connection with for example TCP tunneling (as previously described) in order to making full bandwidth of the connected wireless interfaces available to any device using the TCP/IP protocol. In this case the MWR can be configured as a gateway, allowing devices on the local RF network to transparently access Internet resources. Any requests can be tunneled to the server computer (51), which may be located within the studio network. With this configuration, while the camera operator is recording a shot for example, the reporter can be fact checking their story, or even starting to edit some of the earlier shots. The server computer (51) can be connected to the Internet or may be implemented as a cloud service. Transport of data across the wireless networks may be achieved using a variety of possible techniques such as Multipath TCP.

The rules used for establishing an appropriate performance profile may involve various strategies for varying transport for example depending on the type of data being sent. In cases where the transfer is not interactive (for example in the case of transferring a large file, perhaps an edited sequence or previously recorded shot), a bulk mechanism may be used. In this case, all data can be treated equally and therefore sent on the next available interface regardless of the latency.

For interactive sessions, however, the MWR can perform protocol inspection and select the most appropriate route depending on the data request. Session initiation requests (for instance to start an SSH session), are sent through the connection with the lowest latency resulting in a faster feel and a better end-user experience.

Whatever transport is used, the mechanism is transparent to the end user. The user's devices do not require modifications and/or special software to work in the new environment.

FIG. 12c, as stated earlier, shows an IP implementation of the multipath router, in which the MWR servers one or more IP clients through an IP proxy, permitting the IP client to connect to the server computer (51) as a gateway to one or more Internet connected services. The MWR facilitates the improved network communications between the IP client and the server computer (51) via Wireless Networks B,C,D, and thereby improved access to the services connected to the server computer (51).

Illustrative Use Cases

The present invention may be further explained by referring to further examples illustrating aspect of the invention.

Figure 13:
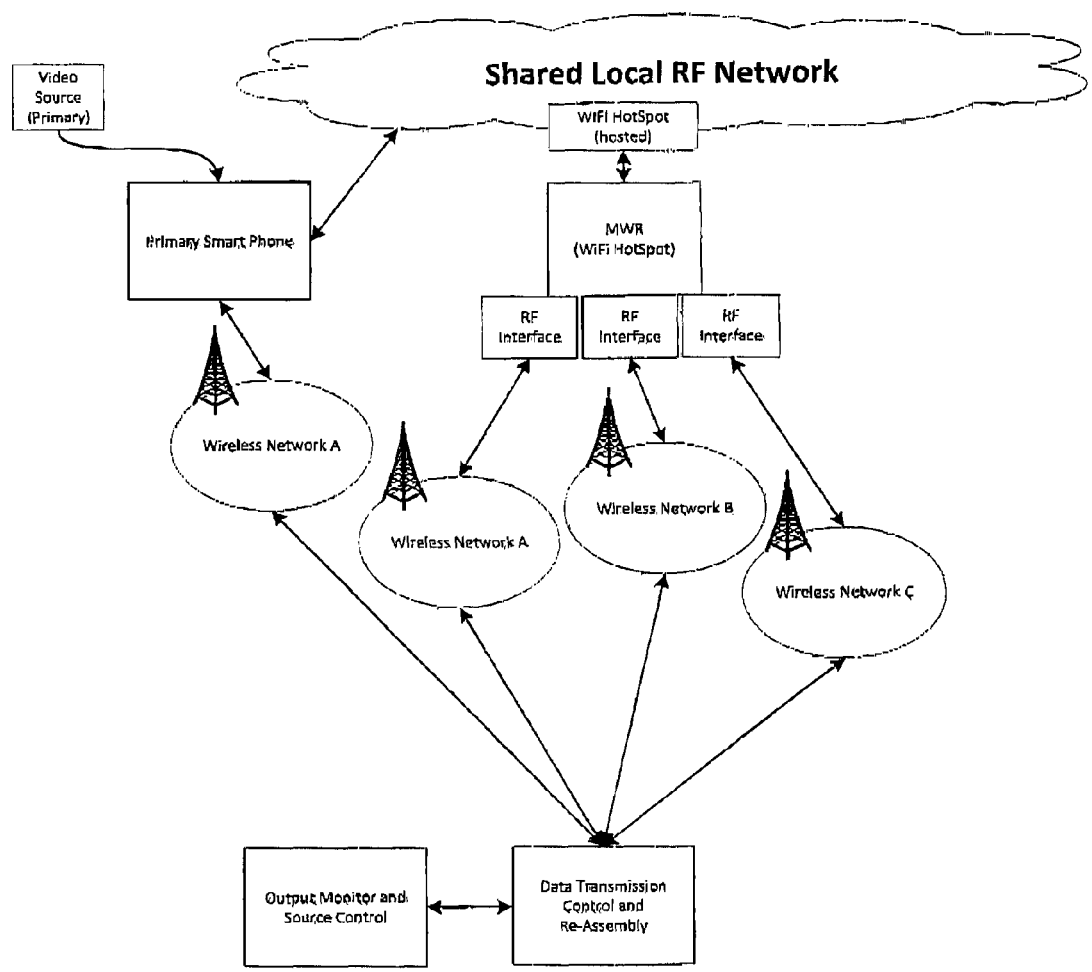
FIG. 13 is an illustrative example of a reporter using an MWR for multiple redundant connections.

FIG. 13 illustrates a possible implementation of the MWR, wherein a smart phone connects through a WiFi in order to access an MWR hot spot.

As an illustrative use case, a reporter might test out her IPhone™ as a video recording device at the office before heading out to a location, and find that the available Wi-Fi network is sufficient to transmit a broadcast quality picture. However, when she heads out to capture some images on location at an event, she may find that Wi-Fi is unavailable, and the cellular network may be overloaded with wireless traffic and only capable of delivering 500 Kbps. Thus, it may be impossible to provide a live picture on location.

If instead she took along a compact wireless router, she could connect through Wi-Fi as well to another cellular network and gain another 500 Kbps. The transmitter software on the iPhone splits the traffic over both connections allowing a much greater throughput than either of the connections alone. All traffic is reassembled at the reporter's office for direct injection into the broadcast studio. In theory, 1 Mbps should be enough bandwidth to transmit a decent quality picture, but with a high volume of data and network latency swinging wildly, the transmitted video may include frequent breakups and on-screen artifacts such as visible macro-blocking.

Needing the redundancy of multiple connections, the reporter could instead take along a multipath wireless router or MWR as described above (FIG. 13). The MWR could be left in a vehicle located near the site where the MWR would be safe, and connected to the vehicle's battery or another power supply. Connected to the MWR are three cellular modems, each of which appears as a virtual extension and as an available route to the Internet. When the reporter's iPhone connects to the MWR via Wi-Fi, the iPhone can retrieve the additional routing information and sets up four separate routes to available network connections: one for the internal cellular connection in the iPhone, and one for each of the network connections available on the MWR. The traffic over each connection is, once again, routed back to the reporter's studio, where they are reassembled into video for broadcast. With these additional connections, she is able to connect to four different networks, with approximately 2 Mbps total throughput. The four network connections now provide more than enough bandwidth to record the event and transmit it live, despite the heavy local traffic.

In another example, a blogger has traveled to the US from Europe to cover the upcoming election. For portability, he brought his iPhone to film the crowds and some of the speeches. However, his iPhone is SIM locked to his European carrier and transmitting streaming video at any bandwidth while roaming is prohibitively expensive. Fortunately, the local news outlet offers locally configured MWRs. The blogger signs one out and travels to the conference.

At the conference, he instructs the iPhone application to use low-cost mode (Wi-Fi only) and disallows broadcasting on the built-in cellular modem. The iPhone connects to the MWR where there are three networks available, giving more than enough bandwidth and redundancy for a reliable live shot. Data over each of the networks is directed to a web server where they are reassembled and the resulting video streamed live to the Web.

The blogger also retains his usual phone number, ensuring he doesn't need to distribute another contact number while travelling.

In another example, an employee has a smart phone for personal use. His employer sends him out to inspect an equipment installation and report the progress live. Instead of providing another phone, the employer gives the employee and MWR configured for the available networks.

In another example, a security company installs an MWR in a central location on a client premises and several low-cost cameras with a small video processor and Wi-Fi combination attached (similar to the Raspberry PI demonstration board). The camera units all make use of Wi-Fi and the MWR to transmit live footage of the grounds to the monitoring center. The MWR provides easy installation and connection redundancy.

FIG. 14 illustrates a possible implementation of a boss/laborer implementation of the present invention. Boss/laborer define two broad roles for the transmitting components of the present invention. The Boss role generates and/or encodes the data to be sent wirelessly, and selects the most appropriate route. The route chosen may require the assistance of one or more of the Labourer devices. Devices in the Labourer role have unused (spare) wireless bandwidth available and volunteer to share their data connection(s). The Labourers may be compensated (directly or indirectly) for providing access.

The additional bandwidth gained from nearby devices makes high quality live video transmission possible. For example, a professional camera crew is unable to get enough bandwidth for a live video shot. They are in a crowd, and there are simply too many other mobile devices (and smart phones) roaming in the crowd nearby. The camera crew is unable to record live and must instead record to tape for later playback. Alternatively, the station could recruit labourers from the surrounding population of devices (either among the crew or from the crowd itself). With the newly gained bandwidth, the crew is able to capture the performance live.

Implementing multipath routing based on the present invention; a group of mobile devices are given the ability to identify themselves as either a boss or a laborer. Bosses declare themselves as needing network access, essentially having work available. In one implementation, laborers advertise themselves as having spare network capacity available, in a given geographical area.

In one implementation, volunteer laborers could download an application onto their device that allows them to take part in the labor pool. People who wish to take part use the application to 'check in' to a geographic location to confirm their availability, set limits (on capacity in terms of total bytes and bytes per second), and identify their network connection. In return for their participation, the station may elect to compensate the laborers either directly (payments for airtime credit), or indirectly (for example a VIP program that gives entry to limited access events, points towards gifts, or other special rewards).

In one aspect of the invention, a labourer device may include a component (such as mobile application) configured to manage various aspects of the collaboration between mobile devices enabled by the present invention. For example, requests for "lending" network resources may be sent to a user's mobile device, and may require acceptance by the user. For example, the request can be brought to the attention of the user for example using an alarm or displaying the request to the display of the user's mobile device. The request may be filtered based on one or more preferences that may be defined by the user, for example based on a measure of one or more incentives available through the system. The incentives may include crediting of an account with points, monetary value, or virtual currency. Alternatively, depending on the settings, certain requests (for example from specific users or meeting particular incentive criteria) may be processed automatically. A skilled reader will understand that various other features are possible.

Continuing with the media outlet example, the outlet may control and configure the mobile application (branding, rewards, rates). In situations where the crew is carrying devices, those devices may be pre-associated as members of the station's labor pool and automatically included as available resources.

The server computer tracks the availability of laborers and acts as a clearing house for any boss requests. When an individual requires more bandwidth, they advertise for laborers, specifying what they are willing to offer as compensation for the use of the laborer's bandwidth. The server computer automatically manages laborer availability, matching them up to potential bosses based on requirements and availability. They also remove laborers from the pool when they become unsuitable. For instance, when a laborer leaves a geographical area, or they reach their stated traffic limits.

Labor pools may be managed as specific to a station—laborers in a station pool are only available to bosses authorized by that particular station. Alternatively, the labor pool could be operated by a location/event and made available to any crew that needs additional bandwidth. Finally, a larger public pool could be operated, irrespective of geographical location. Since the bosses must communicate with the laborers via WiFi, there is a fundamental limit on the number of devices available in any labor pool, even in the general case. There might be thousands of devices in the public pool, but there are only going to be a limited number within Wi-Fi range.

Once labourers are matched to a job, the boss is able to make use of their bandwidth, aggregating them together to gain a greater overall capacity. With a group of devices, ideally spread across multiple networks, the boss (transmitter) is able to send high quality live video to the Internet (and beyond).

It may be more efficient to share the costs of transporting a stream across multiple accounts that, taken in aggregate, have the capacity under the terms of their plan(s). Speed—in crowds and otherwise overloaded networks, a single device is able to get enough bandwidth to transmit a (high) quality video stream. Shared expenses—multiple devices could pool their access for a better experience.

Gaming is quickly becoming one of the primary driving forces behind the adoption of advanced mobile devices and smart phones. However, without a fast and reliable network connection, gamers are either not able to access their favorite games, or their experience is less than pleasurable. Network delay (lag) and connection drop is capable impairing gaming experience. In some cases, having a faster network access time conveys a slight advantage. The present invention may be used for in a variety of gaming applications to improve user experience.

In one example, a group of people get together once a week to socialize and play the latest dungeon crawler at their local pub. The pub does not provide Wi-Fi access. The devices in use are distributed across the available cellular networks A and B; however, in this location Network B has extremely poor coverage. As a result, half of the garners are forced to sit back and watch the action as their network connection just can't keep them in the game. Each of the devices implements the multipath routing application effectively operating in both the boss and laborer roles. The dominant role is determined by the wireless connections available on the device and those in the surrounding labor pool. Connection information is shared amongst the devices as their owners arrive at the pub and start the gaming session. A session could be public with no authorization required to join the pool, or require an identifier and password. The application starts both the local RF and cellular connections and tracks both connectivity and ping times (network lag) on all networks. The measured cellular ping times and reliability are advertised to the other group members. Peer devices choose the lowest connection time as their main route for game traffic, constantly monitoring it for load.

Each device is can be responsible for monitoring their own traffic requirements, and using the available network information (most typically latency information, but other feedback is included in the analysis as well) to calculate both the device's likely requirements, and the amount of bandwidth that could be made available for sharing with the other group members.

The owner of the device is also able to set limits, perhaps reserving a percentage of the calculated throughput for safety, or to set bandwidth usage caps to prevent overage charges. Caps may take the form of absolute limits (no more than 'X' bytes per month/billing cycle) or rates (no more than 'Y' bits per second).

One possible implementation creates a reservation scheme, allowing a boss on one of the other devices to reserve bandwidth on each laborer the boss intends to use. Reservations may take the form of a percentage of bandwidth, with the laborer having the final say on the actual bit rate that is made available.

For instance, the labor may calculate and find that it has an available bit rate of 1 Mbps with a transmitter to server one way latency of 30 ms. The device also calculates that current requirements are 500 Kbps. The owner has requested a 10% safety margin and set a cap of no more than 25% of the available rate and no more than 500K bytes for this session.

This being the fastest time available, one of the other devices requests 500 Kbps (assuming they're playing the same game and have similar requirements). The laborer responds with the maximum available (250 Kbps). The boss accepts this rate, but must also continue to use its own internal WAN connection or negotiate with another laborer in the pool to acquire enough bandwidth.

If multiple devices request bandwidth from a laborer, the available excess may be shared equally. Another algorithm might allow for auctioning to the highest bidder, or sharing, but unequally to ensure that all devices have the same average network latency, or even prioritizing certain packet types and varying the bandwidth distribution as required, At any time, while transmitting, the available WAN bandwidth for the laborer may fluctuate. If it fluctuates below the device's local requirements, the available bandwidth for sharing is reduced to zero. The laborer continuously reports their available bandwidth and current network conditions (latency, etc) to all connected bosses.

In the above example, if the calculated available bandwidth drops to 800 Kbps, the connected boss is notified that the reserved bandwidth is now 150 kbps:

700 kbps(available)−500 kbps(game)−50 kbps(safety margin)=150 kbps

The new rate (and likely new, longer latency) is reported to the boss. The boss is responsible for finding a new route for the data that the laborer can no longer carry.

As load increases, the lag may increase as well, causing a device to migrate all or some part of the application data to one of the alternate connected peers. If there are multiple suitable routes back to the Internet, traffic can be shared via a distribution algorithm.

For those applications using a session-less protocol (i.e. UDP), a reassembly module in the Internet may not be required. Since each request/response is whole in itself, they can be sent on any network, directly to the host.

Session based protocols (i.e. TCP) require a tunnel to a gateway machine where the session can be reassembled before being routed to the intended destination. Local RF only devices and those with poor cellular connectivity can make use of those connections that are high performing Advantages due to faster ping times (lower network induced lag) are cancelled out as all the devices in the group have access to the fastest network.

In another example, a group of teenagers are al attending a local concert. As amateur film directors, they've entered into an agreement to film a portion of the concert live. Each is carrying a smart phone with necessary client software installed. They turn on their devices, and one becomes the primary transmitter. The other phones connect to it (and to each other) via an ad hoc and private Wi-Fi network. The primary starts recording, with the software automatically dividing the resulting stream and transmitting a portion to each of the connected laborers. Each laborer then resends the data over its WAN interface to a server in the cloud where the video stream is reassembled. The resulting stream is available live to the teenager's peers. The server also archives the stream for submission to one of the social networks. The encoding quality is much high than would be possible with a single smart phone connection, and far more reliable.

In the preceding description, for purposes of explanation, numerous details are set forth in order to provide a thorough understanding of the embodiments. However, it will be apparent to one skilled in the art that these specific details may not be required in cell embodiments. In other instances, well-known electrical structures and circuits are shown in block diagram form in order not to obscure aspects of the embodiments. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Thus, in an aspect, there is provided a system for transmission of multiple data streams from a mobile device to a network comprising: a wireless router configured to provide a plurality of network connections; and a router module provided on the mobile device, the router module configured to route data recorded by the mobile device into multiple data streams in dependence on the plurality of network connections for transmission to the multipath wireless router.

In an embodiment, the router module provided on the mobile device transmits the multiple data streams to the wireless router using Wi-Fi.

In another embodiment, the plurality of network connections comprises one or more or cellular, satellite, and wired Ethernet connections.

In another embodiment, the mobile device further includes a cellular network connection, and the router module is configured to route the data recorded by the mobile device into multiple data streams in further dependence on the cellular network connection.

In another embodiment, the router module is configured to route data into multiple data streams in dependence upon the cost of the plurality of network connections for transmission to the multipath wireless router.

In another embodiment, the router module is configured to route data into multiple data streams in dependence upon the bandwidth of the plurality of network connections for transmission to the multipath wireless router.

In another embodiment, the router module is configured to route data into multiple data streams in dependence upon the reliability of the plurality of network connections for transmission to the multipath wireless router.

In another aspect, there is provided a method of transmission of multiple data streams from a mobile device to a network comprising: configuring a wireless router to provide a plurality of network connections; and providing a router module provided on the mobile device, the router module configured to route data recorded by the mobile device into multiple data streams in dependence on the plurality of network connections for transmission to the multipath wireless router.

In an embodiment, the method further comprises using the router module provided on the mobile device to transmit the multiple data streams to the wireless router using Wi-Fi.

In another embodiment, the plurality of network connections comprises one or more or cellular, satellite, microwave, and wired Ethernet connections.

In another embodiment, the mobile device further includes a cellular network connection, and the method further comprises configuring the router module to route the data recorded by the mobile device into multiple data streams in further dependence on the cellular network connection.

In another embodiment, the method further comprises configuring the router module to route data into multiple data streams in dependence upon the cost of the plurality of network connections for transmission to the multipath wireless router.

In another embodiment, the method further comprises configuring the router module to route data into multiple data streams in dependence upon the bandwidth of the plurality of network connections for transmission to the multipath wireless router.

In another embodiment, the method further comprises configuring the router module to route data into multiple data streams in dependence upon the reliability of the plurality of network connections for transmission to the multipath wireless router.

The above-described embodiments are intended to be examples only. Alterations, modifications and variations can be effected to the particular embodiments by those of skill in the art without departing from the scope of this disclosure, which is defined solely by the claims appended hereto.

What is claimed is:

1. A computer system for improving network communications, the computer system comprising:
   a. at least one mobile device; and
   b. a computer-implemented network router linked to the at least one mobile device, or associated mobile devices, and configured to connect to, or initiate the connection to, a plurality of networks using associated network connections, wherein the network router accesses iteratively real time or near real time performance data for the plurality of networks, and based on the performance data determines a network communication performance profile, and based on the performance profile splits information into multiple data streams and controls a transfer of the multiple data streams via the associated network connections and the plurality of networks, thereby improving transmission of the information from the at least one mobile device;
   wherein the performance data is accessed iteratively, thereby optionally updating the performance profile successively, and permitting the network router to vary selective transmission across the network connections based on updates to the performance profile;
   wherein at least one of the plurality of networks is a wireless network, and at least one of the network connections is a wireless network connection; and
   wherein the network router is configured to generate the performance profile in part based on cost considerations associated with the plurality of networks, using one or more cost minimization rules.

2. The computer system of claim 1, wherein the network router bonds a plurality of network connections based on the performance profile so as to improve, for the transmission of the information, data through-put, error resiliency, and robustness.

3. The computer system of claim 1, wherein the information consists of audio or video data, and the computer system improves wireless network transfer conditions for audio or video data using a mobile device.

4. The computer system of claim 1, wherein the network router is a wireless router that defines a plurality of wireless transfer channels for carrying the data streams, wherein each wireless transfer channel is operated independently of the other wireless transfer channels.

5. The computer system of claim 4, wherein the wireless router encodes the information into the plurality of wireless transfer channels, and selectively varies an encoding rate for each of the plurality of the wireless transfer channels based on the then current performance profile.

6. The computer system of claim 2, wherein the network router collects performance data for each of the network connections and also optionally overall performance data for the bonded network connections, and transfers such performance data to an encoding device via a wired or wireless connection in order to improve an overall data transmission rate provided by the computer system.

7. The computer system of claim 1, wherein the networks include at least one Wi-Fi network.

8. The computer system of claim 4, wherein the wireless router automatically finds and connects to available wireless networks in the vicinity of the mobile device for use of such wireless networks as wireless transfer channels.

9. The computer system of claim 4, wherein the wireless router is implemented at a location and provides improved quality of service to one or more mobile devices within an area in the vicinity of the location.

10. The computer system of claim 4, wherein the wireless router is implemented to the mobile device, and provides a solution for improving performance of transfer of information over wireless networks from the mobile device.

11. The computer system of claim 4, wherein the wireless router is configured to enable sharing of wireless network resources across a plurality of mobile devices by permitting one or more first devices or boss devices to request available wireless network resources from one or more second devices or laborer devices, and access such available wireless network resources of the laborer devices, on a temporary basis, in order to improve wireless network connectivity performance at the boss device(s) in connection with an information transmission request.

12. The computer system of claim 11, wherein each mobile device executes a mobile computing component, which when executed manages the sharing of wireless network resources between the laborer device(s) and the boss device(s).

13. The computer system of claim 11, wherein the mobile computing component enables a user of a laborer device to select one or more preferences pertaining to the sharing of the user's mobile device's wireless network resources.

14. The computer system of claim 13, wherein the mobile computing component enables the user of the laborer device to select their preferences dynamically, including based on a real time or near real time requests associated with a proximate boss device or boss devices.

15. The computer system of claim 1, wherein computer system includes a network connected server computer, wherein the server computer is linked to one or more applications or services, and the network router is configured to act as a proxy for connecting at least one mobile device to the server computer and thereby to its applications or services, and wherein the network router improves network communications as between the network router and the server computer.

16. The computer system of claim 1, wherein the plurality of network connections comprises one or more or cellular, satellite, and wired Ethernet connections.

17. The computer system of claim 4, wherein the wireless router is configured to generate the performance profile based on performance of the wireless networks relative to one or more transfer requirements based on one or more attributes of the information.

18. The computer system of claim 11, wherein the computer system includes a network connected server computer that includes programming which when executed enables the management of network resource sharing between the one or more boss devices and one or more laborer devices.

19. The computer system of claim 11, wherein the server computer includes or links to one or more gaming applications or computer network implemented gaming services, and the server computer enables the sharing of network resources between a group of devices that are varied between a boss status and a laborer status depending on their varying game status based on a game in a manner that achieves improved game experience for each player.

20. The computer system of claim 15, wherein the computer system permits a mobile media professional, by means of the improved network communications, to transmit high definition audio and/or video data or to access studio resources implemented to a remote server computer or computer network implemented service.

* * * * *